United States Patent
Nidelkoff et al.

(10) Patent No.: US 9,356,264 B2
(45) Date of Patent: May 31, 2016

(54) ELECTRODE ASSEMBLIES INCLUDING A MANDREL AND AT LEAST ONE INSULATIVE PORTION

(75) Inventors: Michael J. Nidelkoff, White Bear Lake, MN (US); Jay T. Rassat, Buffalo, MN (US); Sheila A. Mullen, Woodbury, MN (US); Jeffrey J. Clayton, Ramsey, MN (US); Nicholas J. Haupt, Minneapolis, MN (US); Paul B. Aamodt, Minnetonka, MN (US)

(73) Assignee: Medtronic, Inc., Minneapolis, MN (US)

( * ) Notice: Subject to any disclaimer, the term of this patent is extended or adjusted under 35 U.S.C. 154(b) by 1071 days.

(21) Appl. No.: 13/456,700

(22) Filed: Apr. 26, 2012

(65) Prior Publication Data

US 2013/0288092 A1    Oct. 31, 2013

(51) Int. Cl.
| | |
|---|---|
| H01M 4/00 | (2006.01) |
| H01M 2/08 | (2006.01) |
| H01M 2/26 | (2006.01) |
| H01M 10/04 | (2006.01) |
| H01M 10/0587 | (2010.01) |

(52) U.S. Cl.
CPC ............. *H01M 2/08* (2013.01); *H01M 2/263* (2013.01); *H01M 10/0431* (2013.01); *H01M 10/0587* (2013.01)

(58) Field of Classification Search
CPC ............. H01M 2/08; H01M 10/0587; H01M 10/0431; H01M 2/263
USPC ............................................. 429/94; 264/334
See application file for complete search history.

(56) References Cited

U.S. PATENT DOCUMENTS

| | | |
|---|---|---|
| 3,615,834 A | 10/1971 | Sundberg |
| 3,791,868 A | 2/1974 | Compton et al. |
| 4,092,386 A | 5/1978 | Rigstad |
| 4,158,300 A | 6/1979 | Hug et al. |
| 4,212,179 A | 7/1980 | Juergens |
| 4,328,945 A | 5/1982 | Perkins |
| 4,476,624 A | 10/1984 | Klein et al. |
| 4,863,815 A | 9/1989 | Chang et al. |
| 4,879,190 A | 11/1989 | Lundsgaard |
| 4,975,095 A | 12/1990 | Strickland et al. |
| 5,047,068 A | 9/1991 | Stoklosa |
| 5,326,652 A | 7/1994 | Lake |
| 5,486,215 A | 1/1996 | Kelm et al. |

(Continued)

FOREIGN PATENT DOCUMENTS

| | | |
|---|---|---|
| CN | 201440435 U | 4/2010 |
| EP | 2 320 496 A1 | 5/2011 |

(Continued)

OTHER PUBLICATIONS

International Search Report and Written Opinion dated Jun. 25, 2013 for PCT/US2013/037754; 9 pgs.

(Continued)

*Primary Examiner* — Gary Harris
(74) *Attorney, Agent, or Firm* — Mueting, Raasch & Gebhardt, P.A.

(57) ABSTRACT

An electrode assembly for use in a battery may include a mandrel and one or more insulative portions. The insulative portions may be formed about and may extend from one or more end regions of a battery mandrel. Further, insulative portions may electrically insulate one or more elements of the electrode assembly from each other.

12 Claims, 20 Drawing Sheets

(56) References Cited

U.S. PATENT DOCUMENTS

| | | |
|---|---|---|
| 5,958,088 A | 9/1999 | Vu et al. |
| 6,391,068 B2 | 5/2002 | Yoshida et al. |
| 6,485,859 B1 | 11/2002 | Szyszkowski |
| 6,596,427 B1 | 7/2003 | Wozniczka et al. |
| 6,670,071 B2 | 12/2003 | Skinlo et al. |
| 6,881,233 B2 | 4/2005 | Cho et al. |
| 7,070,881 B2 | 7/2006 | Kishiyama et al. |
| 7,141,332 B2 | 11/2006 | Kejha et al. |
| 7,378,181 B2 | 5/2008 | Skinlo |
| 7,432,012 B2 | 10/2008 | Tsukamoto et al. |
| 7,488,553 B2 | 2/2009 | Tsukamoto et al. |
| 7,569,305 B2 | 8/2009 | Skinlo et al. |
| 7,578,898 B2 | 8/2009 | Le Gal |
| 7,601,461 B2 | 10/2009 | Skinlo et al. |
| 7,632,603 B2 | 12/2009 | Tsukamoto et al. |
| 7,833,648 B2 | 11/2010 | Park et al. |
| 7,862,627 B2 | 1/2011 | Li et al. |
| 7,879,486 B2 | 2/2011 | Tsukamoto et al. |
| 8,778,521 B2 | 7/2014 | Nidelkoff et al. |
| 2003/0091893 A1 | 5/2003 | Kishiyama et al. |
| 2003/0134184 A1 | 7/2003 | Skinlo et al. |
| 2004/0053115 A1 | 3/2004 | Skinlo |
| 2004/0053116 A1 | 3/2004 | Skinlo |
| 2005/0174092 A1 | 8/2005 | Dougherty et al. |
| 2006/0085971 A1 | 4/2006 | Andrews et al. |
| 2007/0138905 A1 | 6/2007 | Axelrod et al. |
| 2007/0180686 A1 | 8/2007 | Woo |
| 2008/0248375 A1 | 10/2008 | Cintra et al. |
| 2011/0247204 A1* | 10/2011 | Viavattine et al. .............. 29/730 |
| 2011/0250479 A1 | 10/2011 | Viavattine et al. |
| 2011/0250481 A1 | 10/2011 | Viavattine |
| 2012/0084979 A1 | 4/2012 | Viavattine et al. |
| 2012/0251854 A1 | 10/2012 | Kusama et al. |
| 2013/0288116 A1 | 10/2013 | Rassat et al. |

FOREIGN PATENT DOCUMENTS

| | | |
|---|---|---|
| JP | 06168736 A | 6/1994 |
| JP | 08-329958 | 12/1996 |
| JP | H10-64588 | 3/1998 |
| KR | 2003-053599 | 7/2003 |
| WO | WO 2011/077775 A1 | 6/2011 |
| WO | WO 2013/163151 A1 | 10/2013 |
| WO | WO 2013/163179 A1 | 10/2013 |
| WO | WO 2013/163189 A1 | 10/2013 |

OTHER PUBLICATIONS

International Search Report and Written Opinion dated Jun. 24, 2013 for PCT/US2013/037794; 9 pgs.
International Search Report and Written Opinion dated Jun. 26, 2013 for PCT/US2013/037810; 12 pgs.
U.S. Appl. No. 13/332,686, filed Dec. 21, 2011, Humphrys.
U.S. Appl. No. 13/456,692, filed Apr. 26, 2012, Rassat et al.
U.S. Appl. No. 13/456,714, filed Apr. 26, 2012, Nidelkoff et al.

* cited by examiner

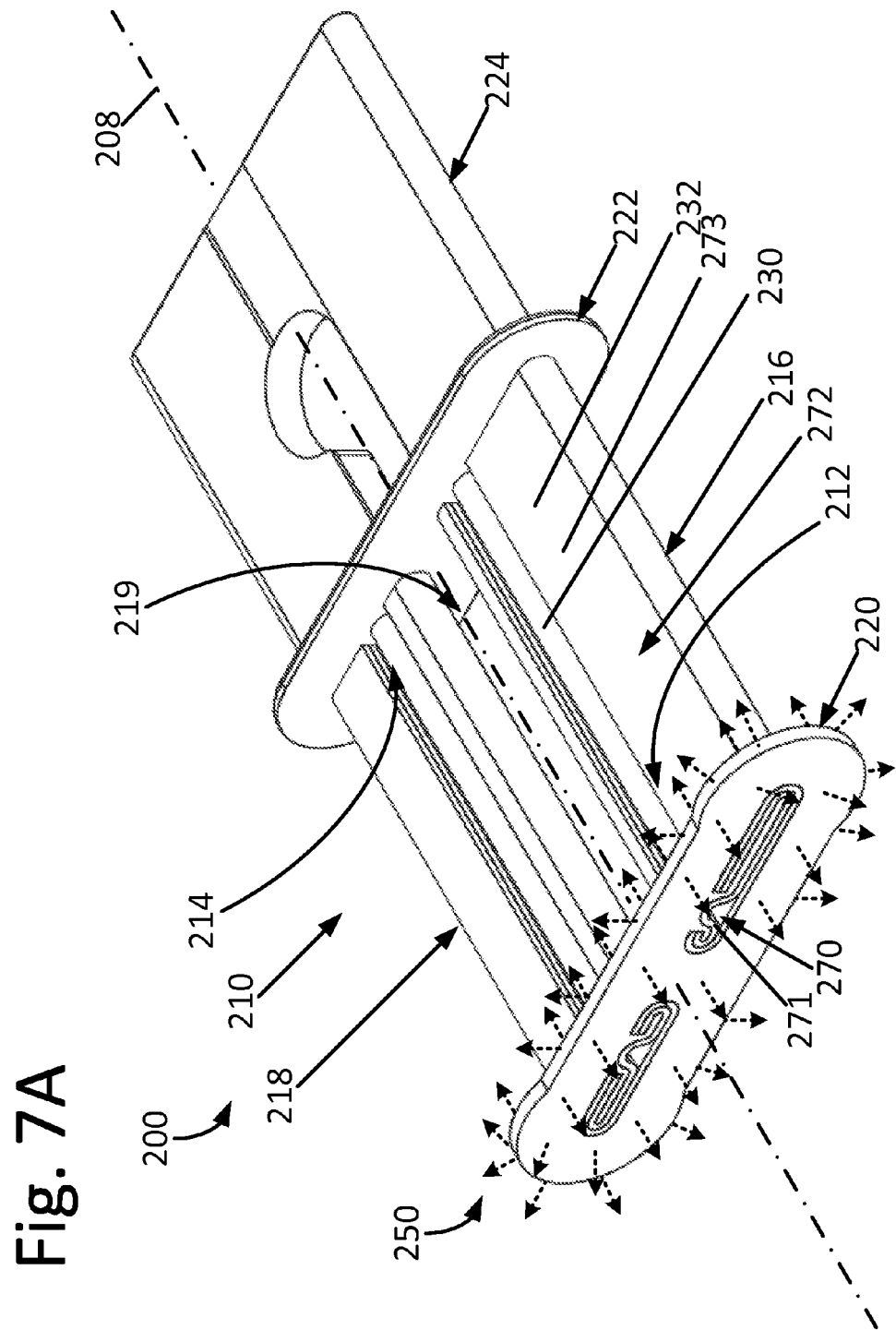

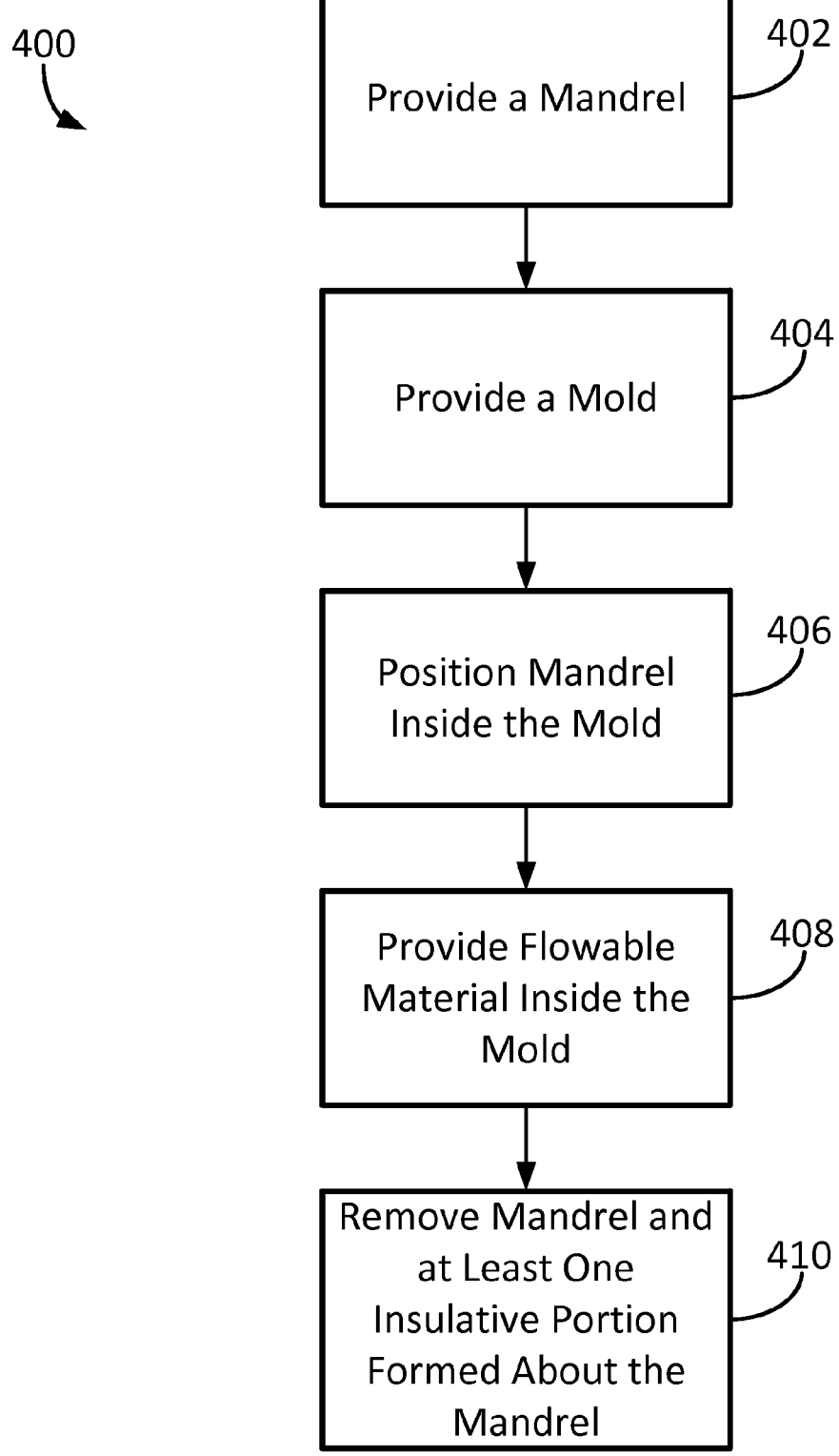

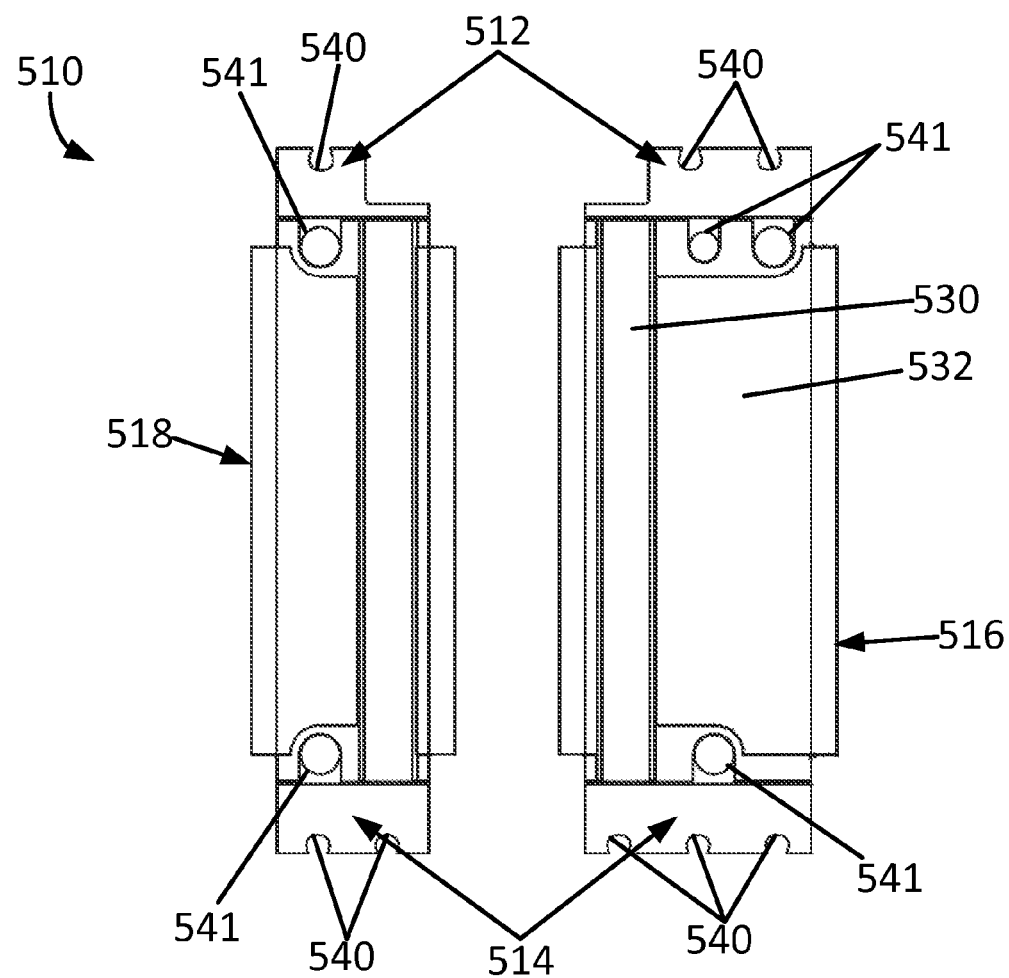

ELECTRODE ASSEMBLIES INCLUDING A MANDREL AND AT LEAST ONE INSULATIVE PORTION

The disclosure herein relates to electrode assemblies including insulative portions and to methods of providing such electrode assemblies.

Batteries for medical devices, such as implantable medical devices, have demanding requirements. For example, such requirements may include long life, high-power output, low self-discharge rate, compact size, and high reliability. Further, the need for miniaturization while maintaining, or increasing, power output may result in the elimination of dead space within a battery. The elimination of dead space, however, may result in a greater difficulty of assembly due to the increasingly small size of components.

Traditionally, coiled battery assemblies have been produced by coupling electrodes to and locating the electrodes about a mandrel (e.g., wrapping around). Once coupled, the mandrel may be removed providing a coiled electrode assembly for use in a battery. The removal of the mandrel from the core of the coiled electrode assembly may potentially damage the electrode assembly (e.g., the core of the coiled electrode assembly may be pulled out with the removal of the mandrel).

Further, coiled electrode assemblies have been produced by locating electrodes around rod-shaped, non-conductive, and/or non-deformable cores. Conductive tabs may be added to each electrode and may be used for electrical connection outside of the battery.

SUMMARY

Generally, the disclosure herein describes electrode assemblies that include a mandrel and one or more insulative portions coupled to the mandrel. Such electrode assemblies may be used in batteries for implantable medical devices. The one or more insulative portions may be formed using a flowable material that may be molded about and may extend from one or more portions of the mandrel. Further, the insulative portions may insulate the mandrel, and portions thereof, from other elements of the battery assembly and may further provide structural support for the battery assembly. In at least one embodiment, the mandrel may include a plurality of portions such as a positive mandrel portion and a negative mandrel portion. In this embodiment, the insulative portion(s) may insulatively couple the positive mandrel portion and the negative mandrel portion.

One exemplary electrode assembly (e.g., to be used in a battery of an implantable medical device) may include a mandrel and at least one insulative portion. The mandrel may extend from a first end region to a second end region along an axis and the mandrel may be configured to be coupled to at least one electrode (e.g., the at least one electrode locatable (e.g., wrappable) at least partially about the mandrel). The mandrel may include a positive mandrel portion and a negative mandrel portion spaced apart from the positive mandrel portion. The at least one insulative portion may be formed about and may extend from at least one of the first and the second end regions of the mandrel. Further, the at least one insulative portion may be formed about the first and the second end regions of each of the positive and the negative mandrel portions.

An exemplary method of providing an electrode assembly (e.g., to be used in a battery of an implantable medical device) may include providing a mandrel extending from a first end region to a second end region along an axis. The mandrel may be configured to be coupled to at least one electrode, the at least one electrode locatable (e.g., wrappable) at least partially about the mandrel. The exemplary method may further include molding at least one insulative portion about and extending from at least one of the first and the second end regions of the mandrel.

In one or more exemplary electrode assemblies and/or exemplary methods of providing such assemblies, the at least one insulative portion may further define a connector element opening configured to allow a connector element to be extended therethrough for coupling to the mandrel. In at least one embodiment, at least a portion of the at least one insulative portion may lie in a plane perpendicular to the axis. In at least one embodiment, the at least one insulative portion may include a first insulative portion formed about and extending from the first end region of the mandrel, and a second insulative portion formed about and extending from the second end region of the mandrel. Each of the first and the second insulative portions may be configured to insulate the mandrel from a battery casing. In at least one embodiment, the at least one insulative portion may include a removable portion, and the removable portion may be configured to be coupled to manipulation apparatus operable to rotate the mandrel to locate (e.g., wrap) at least one electrode around the mandrel. In at least one embodiment, the at least one insulative portion may be configured to insulate and space apart the negative mandrel portion from the positive mandrel portion.

In one or more exemplary electrode assemblies and/or exemplary methods of providing such assemblies, the at least one insulative portion may be an injection molded non-conductive polymer. Further, the at least one insulative portion may include at least one of polypropylene, polyethylene, liquid crystal polymer (LCP), polyvinylidene fluoride (PVDF), styrene butadiene copolymer (SBR), polyether ether ketone (PEEK), ethylene tetrafluoroethylene (ETFE), fluorinated ethylene propylene (FEP), perfluoroalkoxy (PFA), nylon, PEBAX, polybutylene teraphthalate, polyether ester, acrylonitrile butadiene styrene (ABS), polyoxy methylene or aceta (POM), polycarbonate, etc.

In one or more exemplary electrode assemblies and/or exemplary methods of providing such assemblies, at least one of the first and the second end regions of the mandrel may define one or more fixation features configured to engage the at least one insulative portion. In at least one embodiment, each of the positive and the negative mandrel portions may include a connector element coupling portion and an electrode coupling portion, and at least part of the at least one insulative portion may be formed about each of the connector element coupling and the electrode coupling portions to couple the connector element coupling portions and the electrode coupling portions of each of the positive and the negative mandrel portions. In at least one embodiment, each of the positive and the negative mandrel portions may define a connector element coupling region configured for coupling to a connector element and an electrode coupling region configured for coupling to an electrode.

Another exemplary electrode assembly may include a mandrel and at least one insulative portion. The mandrel may extend from a first end region to a second end region along an axis, and may be configured to be coupled to at least one electrode, the at least one electrode locatable (e.g., wrappable) at least partially about the mandrel. The at least one insulative portion may be coupled to at least one of the first and the second end regions of the mandrel (e.g., formed about and extending from at least one of the first and the second end regions of the mandrel), and may include an insulative portion configured to insulate the mandrel from a battery casing and a removable portion removably coupled to the insulative portion.

In one or more exemplary methods of providing an electrode assembly, molding at least one insulative portion about and extending from at least one of the first and the second end regions of the mandrel may include providing a mold, positioning the mandrel inside the mold, providing a flowable insulative material into the mold for engagement with at least one of the first and the second end regions of the mandrel, and removing the mandrel and the at least one insulative portion. In at least one embodiment, molding at least one insulative portion about and extending from at least one of the first and the second end regions of the mandrel may include molding a first insulative portion about and extending from the first end region of the mandrel, and molding a second insulative portion about and extending from the second end region of the mandrel.

In one or more exemplary methods of providing an electrode assembly, the exemplary methods may further include coupling at least one electrode to the mandrel and rotating the mandrel about the axis to locate (e.g., wrap) the at least one electrode on (e.g., about, around, etc.) the mandrel.

The above summary is not intended to describe each embodiment or every implementation of the present disclosure. A more complete understanding will become apparent and appreciated by referring to the following detailed description and claims taken in conjunction with the accompanying drawings.

BRIEF DESCRIPTION OF THE DRAWINGS

FIG. 7A is a perspective view of an exemplary electrode assembly including a mandrel and one or more insulative portions.

FIG. 10 is a block diagram of an exemplary method of providing an exemplary electrode assembly, e.g., the electrode assembly of FIGS. 7A-7D.

FIG. 11A is a front view of an exemplary mandrel for use in an electrode assembly including one or more insulative portions.

DETAILED DESCRIPTION OF EXEMPLARY EMBODIMENTS

Figure 1:
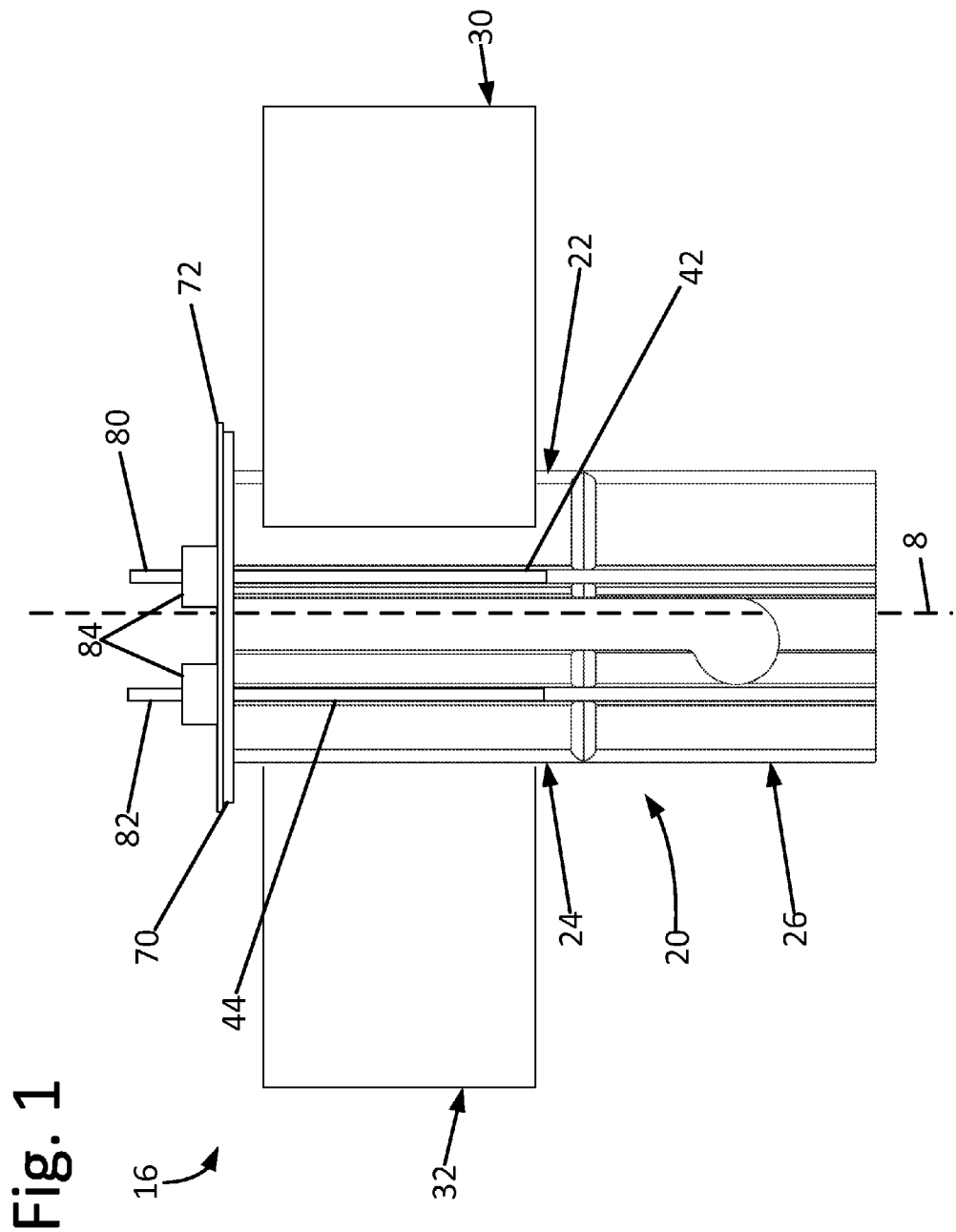
FIG. 1 is a front view of an exemplary electrode assembly.
Figure 2:
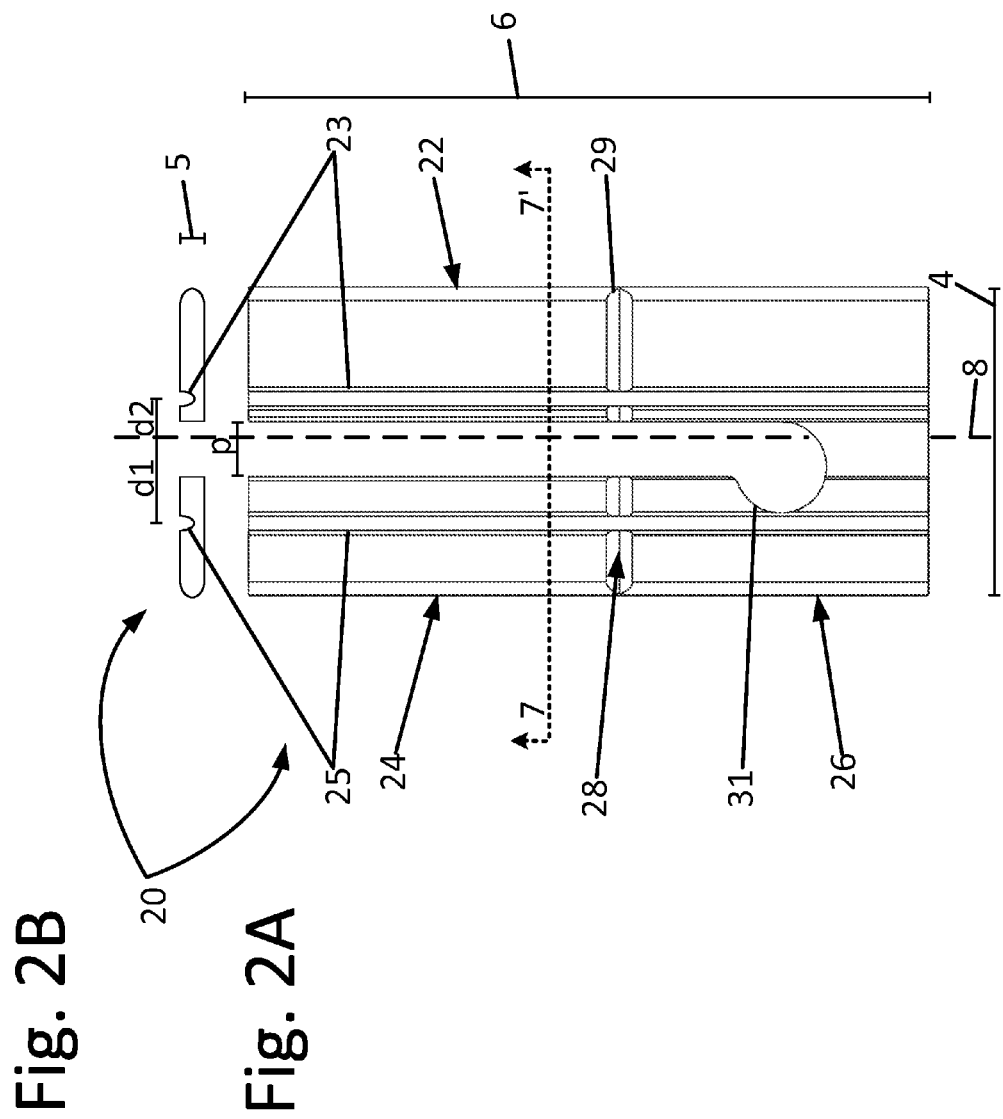
FIGS. 2A-2B are front and cross sectional views, respectively, of an exemplary mandrel of the electrode assembly of FIG. 1.

In the following detailed description of illustrative embodiments, reference is made to the accompanying figures of the drawing which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Exemplary apparatus and methods shall be described with reference to FIGS. 1-12. It will be apparent to one skilled in the art that elements or processes from one embodiment may be used in combination with elements or processes of the other embodiments, and that the possible embodiments of such apparatus and methods using combinations of features set forth herein is not limited to the specific embodiments shown in the Figures and/or described herein. Further, it will be recognized that the embodiments described herein may include many elements that are not necessarily shown to scale. Still further, it will be recognized that timing of the processes and the size and shape of various elements herein may be modified but still fall within the scope of the present disclosure, although certain timings, one or more shapes and/or sizes, or types of elements, may be advantageous over others.

As used herein, the term "mandrel" may refer to at least a portion of an interior core of an electrode assembly upon which one or more electrodes may be wound. Further, the term "mechanically coupled" may refer to a connection between elements, or portions, that resists separation between such elements when faced with ordinary forces that occur during the typical usage of electrode assemblies. Further, the term "electrically coupled" may refer to a conductive connection between electrical components that effectively conducts electricity therebetween. In addition, the term "electrode" may refer to an electrode substrate that can be coated with an active material, e.g., for use in a coiled battery assembly. In at least one embodiment, an electrode may include a substrate in the form of a strip of thin conductive material such as a foil.

The disclosure herein relates to mandrels for electrode assemblies including one or more insulative portions. The electrode assemblies including one or more insulative portions will be described herein with reference to FIGS. 6-12. A general exemplary electrode assembly including a mandrel is described herein with reference to FIGS. 1-5 to, e.g., provide a descriptive reference example.

An electrode assembly 16 including a mandrel 20 having a positive mandrel portion 22 and a negative mandrel portion

24 (e.g., conductive portions) is illustrated in FIG. 1. The electrode assembly 16 further includes positive and negative electrodes 30, 32 and positive and negative connector elements 42, 44. In this example, the positive connector element 42 is a positive feedthrough pin (e.g., elongated and having a circular cross section) and the negative connector element 44 is a negative feedthrough pin (e.g., elongated and having a circular cross section). Although the connector elements 42, 44 are feedthrough pins in this and other embodiments described herein, exemplary connector elements 42, 44 may be any element configured to be coupled to, or part of (e.g., integral with), the positive and negative mandrel portions 22, 24 of the mandrel 20 and configured to conduct electricity from the positive and negative mandrel portions 22, 24 to outside of a battery casing that the electrode assembly 16 may be located within. In at least one embodiment, the connector elements 42, 44 may be elongated portions (e.g., a tabs, etc.) extending from each of the positive and negative mandrel portions 22, 24. In at least one embodiment, the connector elements may be rods having various cross sectional shapes (e.g., rectangular cross section, oblong cross section, etc.). In at least one embodiment, the connector elements may be sheet-like material similar to the electrodes 30, 32.

Figure 4:
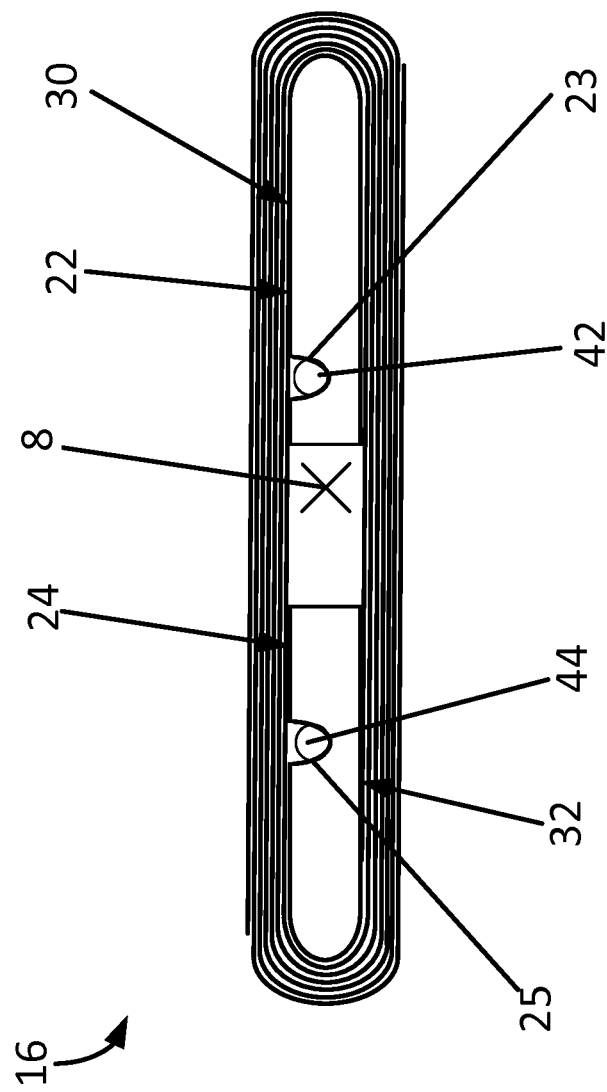
FIG. 4 is an end view of an exemplary coiled electrode assembly using the mandrel of FIGS. 1-3.

As shown, the electrode assembly 16 may be described as being oriented along an axis 8. For example, as shown, the connector elements 42, 44 (and the channels 23, 25 within which the connector elements 42, 44 are located as labeled in FIGS. 2A-2B) are parallel to the axis 8. Further, the mandrel 20 may be configured to be rotated about the axis 8 to wind the electrodes 30, 32 around the mandrel 20 to form a coiled battery assembly (as shown in FIG. 4).

The positive electrode 30 and the negative electrode 32 may be coupled (e.g., electrically coupled, mechanically coupled, bonded, etc.) to the mandrel 20. More specifically, the positive electrode 30 may be electrically and mechanically coupled to the positive mandrel portion 22 and the negative electrode 32 may be electrically and mechanically coupled to the negative mandrel portion 24. As illustrated, the positive electrode 30 and the negative electrode 32 may be coupled to the mandrel 20 on opposite faces (or sides) while the connector elements 42, 44 may be coupled on the same face (or side) of the mandrel 20. In at least one embodiment, the positive electrode 30 and the negative electrode 32 may be coupled to the mandrel 20 on the same face (or side). In at least one embodiment, the connector elements 42, 44 may be coupled to the mandrel 20 on opposite faces (or sides).

As shown, the positive electrode 30 and the negative electrode 32 can be electrically coupled to the mandrel portions 22, 24, respectively, by welding the electrodes 30, 32 to a flat, or planar, surface of the mandrel portions 22, 24 of the mandrel 20 (see FIG. 3) as further described herein. Further, a separator (not depicted) can be located (e.g., placed, interwoven, etc.) between the positive and negative mandrel portions 22, 24 of the mandrel 20 through passage "p" labeled in FIGS. 2A-2B to, e.g., electrically isolate, or insulate, the positive mandrel portion 22 from the negative mandrel portion 24 when the electrode assembly 16 is assembled into a battery.

The mandrel 20 may further include removable portion 26 and may define a decoupling region 28 configured to assist the removal of the removable portion 26 from the positive and negative mandrel portions 22, 24, e.g., after the electrode assembly 16 has been located within a battery casing, after the electrode assembly 16 has been produced, etc. As used herein, a "removable portion" may refer to a portion of the mandrel 20 that can be detached from the remainder of the mandrel 20. In at least the embodiment depicted, the decoupling region 28 may include a depression 29 that is formed (e.g., scored, molded, stamped, etc.) between the removable portion 26 and the remainder of the mandrel 20 to allow the removable portion to be removed from the remainder of the mandrel 20. In at least one embodiment, the removable portion 26 may be detached, or decoupled, by snapping, cutting, breaking, tearing, and/or clipping the removable portion 26 from the remainder of the mandrel 20.

The depression 29 (e.g., a channel, groove, etc.) may extend across the mandrel 20 perpendicular to the axis 8 and between the mandrel portions 22, 24 and the removable portion 26. As such, the removable portion 26 may be removed (e.g., "broken off") from the positive and negative mandrel portions 22, 24 by holding the positive and negative mandrel portions 22, 24 stationary and rotating the removable portion 26 about an axis (e.g., an axis perpendicular to the axis 8) defined by the depression 29.

Although the depression 29 is depicted in one or more embodiments described herein, it is to be understood that the exemplary mandrels described herein may include any one or more features or elements in the decoupling region 28 different than the depression 29 that are configured to assist the removal of the removable portion 26 from the positive and negative mandrel portions 22, 24. For example, the decoupling region 28 may include a perforation, a thinned region, a weakened region, tabs, balls, isolated geometric decoupling features, cones, pins, rods, alternative weaker material, alternative materials with a different melting temperature, etc., which may be configured to assist in the removal of the removable portion 26 from the positive and negative mandrel portions 22, 24. Further, in at least one embodiment, no feature or element may be included, or defined, in the mandrel 20 in the decoupling region 28. In this example, the removable portion 26 may be removed from the positive and negative mandrel portions 22, 24 by removing material (e.g., cutting) between (e.g., using a laser, saw, heating, etc.) the removable portion 26 and the positive and negative mandrel portions 22, 24.

While the exemplary mandrels described herein can be made using any appropriate process, an exemplary mandrel can be made using electric discharge machining (EDM). Alternatively, an exemplary mandrel can be made by metal extrusion or by injection molding depending on the needs of the battery and the composition of the mandrel. Further, an exemplary mandrel can be formed using one or more progressive stamping processes. Still further, the regions, channels, grooves, etc. formed in the exemplary mandrels (e.g., for receiving connector elements, for forming the decoupling region, or for any other feature or element) can be made, produced, or formed, by machining, etching, stamping, cutting, welding, swaging, crimping, extruding, electromagnetic forming, hot isostatic processing, thermal mechanical or thermomechanical forming, hydro mechanical forming, and/or any other method.

The width 4 of the mandrel 20 (as shown in FIG. 2A) may be greater than or equal to about 0.1 inches, about 0.2 inches, about 0.25 inches, about 0.3 inches, etc. Further, the width 4 of the mandrel 20 may be less than or equal to about 0.35 inches, about 0.4 inches, about 0.45 inches, about 0.5 inches, about 0.6 inches, etc. The length 6 of the mandrel 20 (as shown in FIG. 2A) may be greater than or equal to about 0.4 inches, about 0.5 inches, about 0.6 inches, about 0.7 inches, etc. Further, the length 6 of the mandrel 20 may be less than or equal to about 0.75 inches, about 0.8 inches, about 0.85 inches, about 0.95 inches, about 1.0 inches, about 1.25 inches, about 1.25 inches, etc. The thickness 5 of the mandrel 20 (as shown in FIG. 2B) may be greater than or equal to about 0.005 inches, about 0.01 inches, about 0.015 inches, about 0.02 inches, etc. Further, the thickness 5 of exemplary mandrel 20 may be less than or equal to about 0.025 inches, about 0.03 inches, about 0.04 inches, about 0.045 inches, about 0.05 inches, about 0.06 inches, etc.

In the embodiment depicted, channels 23, 25 for receiving the connector elements 42, 44 (e.g., positive and negative feedthrough pins, etc.) may be formed in the positive and negative mandrel portions 22, 24, respectively, of the mandrel 20. Although the channels 23, 25 as shown are both on the same face (or side) of the mandrel 20, in other embodiments, the channels 23, 25 may be on opposite faces. It is to be understood that the channels 23, 25 (e.g., grooves, etc.) may be appropriately sized and/or shaped to accommodate various shapes and sizes of connector elements 42, 44. For example, the channels 23, 25, can be in the shape of a "V," a rounded groove, a square bottomed groove, a "C," a half hex, a beveled square bottomed groove, a dovetail groove, etc. Further, the channels 23, 25 may be sized to be slightly smaller than the connector elements to be received therein so as to form an interference fit if the connector elements 42, 44 were pressed or forced into the channels 23, 25.

The electrodes 30, 32 may also vary in size, shape, and length. In at least one embodiment, the electrodes 30, 32 may be a foil or other thin malleable conductive substrate (e.g., a grid, expanded metal, mesh, etc.). In at least one embodiment, the foil can be in the form of a metal foil such as, for example, aluminum, steel, silver, copper, nickel, titanium, vanadium, and/or combinations or alloys thereof.

The length of the electrodes 30, 32 (e.g., when the electrodes are unrolled) may be greater than or equal to about 1 inch, about 2 inches, about 3 inches, about 4 inches, about 5 inches, about 6 inches, etc. Further, the length of the electrodes 30, 32 may be less than or equal to about 8 inches, about 10 inches, about 14 inches, about 16 inches, about 18 inches, about 20 inches, about 24 inches, etc. The width of the electrodes 30, 32 may be greater than or equal to about 0.05 inches, about 0.1 inches, about 0.2 inches, about 0.3 inches, about 0.5 inches, about 0.6 inches, about 0.75 inches, etc. Further, the width of the electrodes 30, 32 may be less than or equal to about 1 inch, 1.25 inches, etc. The thickness of the electrodes 30, 32 may be greater than or equal to about 0.002 inches, about 0.003 inches, about 0.004 inches, about 0.005 inches, about 0.008 inches, etc. Further, the thickness of the electrodes 30, 32 may be less than or equal to about 0.01 inches, about 0.015 inches, about 0.02 inches, about 0.025 inches, about 0.03 inches, about 0.04 inches, about 0.05 inches, etc. Also, the electrodes 30, 32 can vary in composition depending on the battery chemistry being used as described further herein.

Separator material, e.g., used to separate the electrodes 30, 32 when rolled around the mandrel 20, can be any non-conductive material such as polyethylene, polypropylene and layered combinations thereof. Exemplary separators (e.g., made of separator material) generally have a larger width and length than the electrodes they cover so as, e.g., to fully encase the electrodes. Generally, a separator can be sized to extend beyond a bottom portion of positive and negative mandrel portions 22, 24 after removal of removable portion 26 (e.g., to provide additional insulation towards the bottom portion of the mandrel portions 22, 24). Exemplary separators may be described in U.S. Pat. App. Pub. No. 2011/0250481 A1 published on Oct. 13, 2011 and entitled "COIL SEAL TO SECURE THE ELECTRODE WINDINGS OF AN ELECTROCHEMICAL CELL," which is incorporated herein by reference in its entirety. The separator material may be coupled or uncoupled to the mandrel 20, e.g., prior to locating the separator material between the electrodes 30, 32 when the electrodes 30, 32 are being located about, or around the mandrel 20. In at least one embodiment, the separator material may be passed through the passage "p" (e.g., without coupling the separator material to the mandrel 20) and extended/located such that it will separate the electrodes 30, 32 from each other when the mandrel 20 is rotated to locate the electrodes thereon (e.g., held by tension).

Connector elements 42, 44, (e.g., feedthrough pins) can be sized to fit within the channels 23, 25, or grooves, defined in the mandrel 20 and can be made of any electrically conductive material. For example, connector elements may include (e.g., be formed of) steel, platinum, aluminum, titanium, nickel, copper, tantalum, niobium, etc. and/or combinations or alloys thereof such as, e.g., titanium alloy such as grade 5 or grade 23, platinum-iridium such as 90 percent platinum/10 percent iridium, aluminum sleeve or shell over a titanium core, stainless steel, clad materials, coated materials (e.g., dipped or sprayed), etc. The length of the connector elements 42, 44 may be greater than or equal to about 0.1 inches, about 0.2 inches, about 0.3 inches, about 0.4 inches, about 0.5 inches, about 0.6 inches, etc. Further, the length of the connector elements may be less than or equal to about 0.7 inches, about 0.75 inches, about 0.8 inches, about 1 inch, about 1.5 inches, etc. The diameter of the connector elements 42, 44 may be greater than or equal to about 0.01 inches, about 0.025 inches, about 0.05 inches, etc. Further, the diameter of the connector elements 42, 44 may be less than or equal to about 0.075 inches, about 0.1 inches, about 0.2 inches, etc. Further, the portions of the connector elements 42, 44 that extend outside of the battery case after the electrode assembly has been inserted into a battery case may be cut to length.

The exemplary mandrel 20 of FIG. 1 is further illustrated in FIGS. 2A-2B without the remainder of the electrode assembly 16. More specifically, a front view of the mandrel 20 is depicted in FIG. 2A and a cross sectional view of the mandrel 20 taken across line 7-7' is depicted in FIG. 2B. As shown, the mandrel 20 is planar having two faces or sides (e.g., a front face/side and a back face/side). As described herein, the mandrel 20 may include a positive mandrel portion 22 and a negative mandrel portion 24. The positive mandrel portion 22 may be spaced apart from the negative mandrel portion 24 (e.g., such that the positive mandrel portion 22 and the negative mandrel portion 24 are not electrically coupled and/or not in contact with each other). As shown, a passage "p" separates the two portions 22, 24 (within which an insulative separator may be located). In addition, the mandrel 20 as shown may include a removable portion 26. Between the removable portion 26 and the positive and negative mandrel portions 22, 24 is the decoupling region 28 (e.g., depression 29 as shown) configured to assist the removal of the removable portion 26 from the positive and negative mandrel portions 22, 24.

Further, the mandrel 20 further defines a positive connector element channel 23 and a negative connector element channel 25 for receiving positive and negative connector elements, respectively. For example, the connector element channels 23, 25 may be dimensioned and configured to accept connector elements 42, 44 (such as feedthrough pins shown in FIG. 1). Further, as shown, the positive connector element channel 23 is located, or placed, closer to the axis 8, or midline, of the mandrel 20 than the negative connector element channel 25, which is illustrated by the distance "d2" from the positive connector element channel 23 to the axis 8 compared to the distance "d1" from the negative connector element channel 25 to the axis 8. In at least one embodiment, the channels 23, 25 may be equidistant from the axis 8. Further, in at least one embodiment, the negative connector channel 25 may be closer to the axis 8 than the positive connector channel 23. It is to be understood that the channels can be placed at any location on the mandrel 20. Further, it is also to be understood that having the connector elements positioned at two different distances from the axis 8, a battery top cover 72 (shown in FIGS. 1 and 5A-5B) can be constructed to fit over the mandrel 20 and electrodes 30, 32 located (e.g., wrapped) around the mandrel 20 in only one position, which may insure that the terminals can be more quickly identifiable as positive and negative.

Further, as shown in FIG. 2A, the removable portion 26 can be separated, or removed, from positive mandrel portion 22 and negative mandrel portion 24 along the depression 29. As described herein, the depression 29 can be deep enough such that the mandrel 20 can be broken along the depression 29 resulting in individual positive and negative mandrel portions 22, 24 of the mandrel 20. For example, after the positive and negative mandrel portions 22, 24 have been separated from the removable portion 26, the negative mandrel portion 24 are spaced apart from the positive mandrel portion 22, e.g., such that the negative mandrel portion 24 is not electrically coupled to the positive mandrel portion 22. More specifically, the positive mandrel portion 22 and the negative mandrel portion 24 may be separated by the passage "p" located between the positive mandrel portion 22 and the negative mandrel portion 24. In at least one embodiment, an insulative separator portion may be located in the passage "p" to, e.g., provide structural support to the mandrel 20. As shown, the mandrel 20 may further define an orientation notch 31 shown as a foot-type aperture on the axis 8 of the mandrel 20. In the embodiment depicted in FIG. 2A, the "foot" of the notch 31 points toward negative mandrel portion 24 of the mandrel 20.

Figure 3:
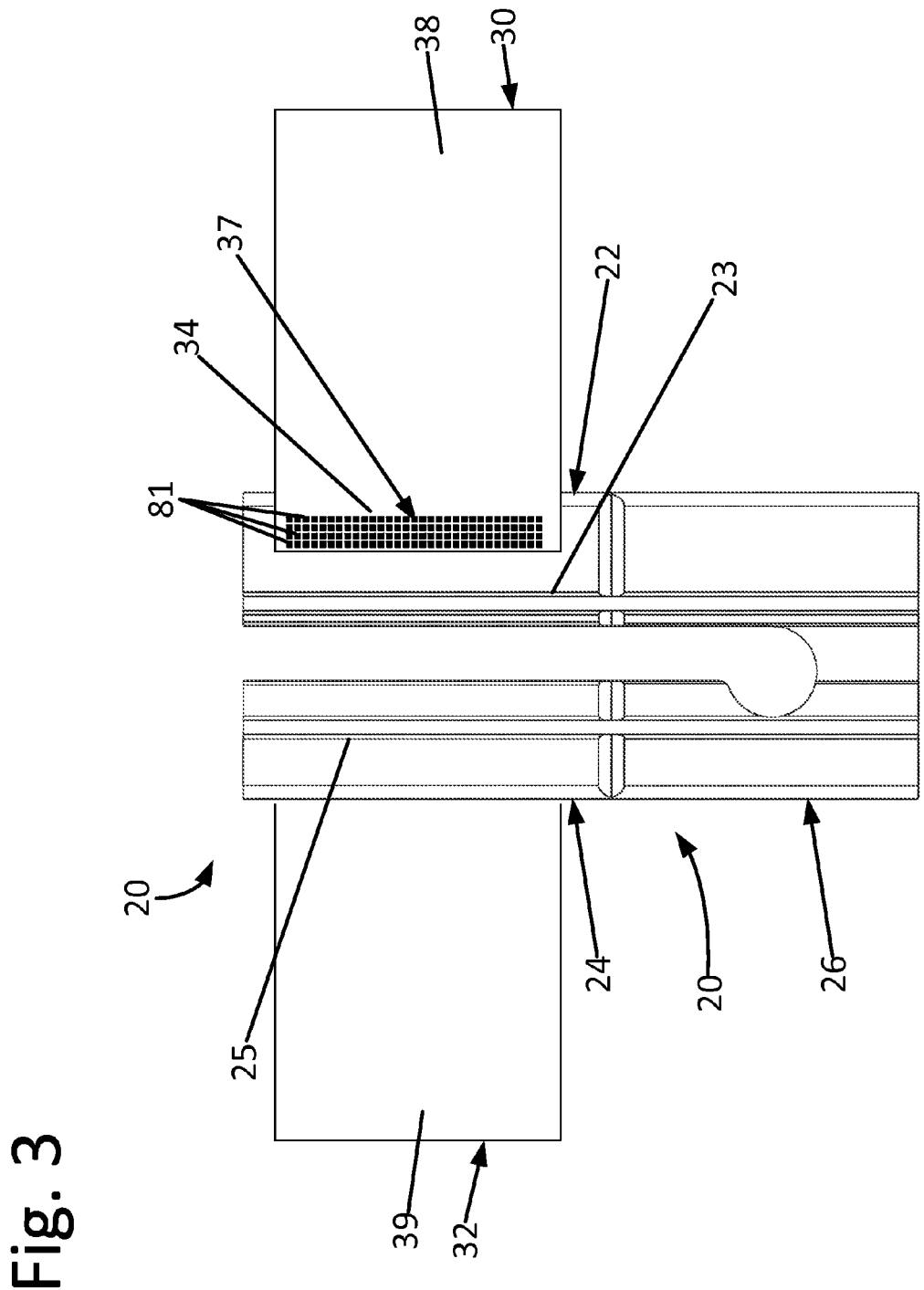
FIG. 3 is a front view of the mandrel of FIGS. 1-2 with electrodes attached thereto.

Electrodes 30, 32 may be attached to the mandrel 20 as shown in FIG. 3. More specifically, a positive electrode 30 may be attached to the positive mandrel portion 22 and a negative electrode 32 may be attached to the negative mandrel portion 24. As shown, the electrodes 30, 32 are attached to opposite sides of the mandrel 20.

The positive electrode 30 can be coated with a positive active material 38. As illustrated, the positive electrode 30 has a proximal end 34 that may not be coated with active material, e.g., for coupling to the positive mandrel portion 22. The proximal end 34 may be attached to positive mandrel portion 22 of the mandrel 20 at a selected, or specific, coupling region 37. Similarly, the negative electrode 32 can be coated with a negative active material 39, and the proximal end (not shown) of the negative electrode 32 may not be coated with active material. The proximal end of the negative electrode 32 may be attached to the negative mandrel portion 24 of the mandrel 20 at a selected, or specific, coupling region (not shown) similar to the coupling region 37 of the positive mandrel portion 22.

The electrodes 30, 32 can be attached to the positive mandrel portion 22 and negative mandrel portion 24, respectively, by welding (e.g., laser welding, ultrasonic welding, resistance welding, etc.), adhering, one or more mechanical processes (e.g., crimping, swaging, etc.), friction stir welding, diffusion, etc. As shown, multiple laser welds 81 may be used to electrically couple the proximal end 34 of the positive electrode 30 to the coupling region 37 of the positive mandrel portion 22. In at least one embodiment, a combination of two or more different types of welds may be used to electrically couple the electrodes 30, 32 and the mandrel portions 22, 24, respectively.

It is to be understood that the positive active material 38 may include any one or more positive active materials used in electrode technology. For example, the positive active material 38 may include lithium cobalt oxide (e.g., for use in rechargeable batteries), carbon monofluoride ($CF_x$), silver vanadium oxide, lithium iron phosphate, lithium polonium, one or more oxides, one or more phosphates, one or more silicates, one or more fluorophosphates, etc. and/or combinations or alloys thereof. Similarly, the negative active material 39 may include any one or more negative active material used in electrode technology. For example, the negative active material 39 may include lithium titanate, artificial graphite powder (MCMB), lithium, one or more oxides, one or more metals or bimetals, silicon, etc. and/or combinations or alloys thereof.

Both the positive and negative electrodes 30, 32 can be coated on one side or both sides to provide an electron flow suitable to generate a current. It is to be understood that coating the electrodes on both sides with active material may allow for more efficient use of the two sides of the electrodes, which may result in increased energy and power in contrast to a single side coated electrode. Further, it is to be understood that the proximal and/or distal ends of the electrodes 30, 32, may not be coated on one or both sides. Still further, it is to be understood that any suitable combination of coatings and coated portions of the electrode(s) is within the scope of this disclosure.

As shown in FIGS. 1 and 4, positive and negative connector elements 42, 44 such as, e.g., the feedthrough pins, may be placed, or located, in the connector element channels 23, 25 and coupled therein. The connector elements 42, 44 may be electrically coupled (e.g., conductively connected, etc.) and mechanically coupled to the portions 22, 24, respectively, of the mandrel 20 using one or more processes such as, e.g., welding (e.g., laser welding, ultrasonic welding, resistance welding, etc.), crimping, stamping, adhering, swaging, friction stir welding, diffusion, etc. In at least one embodiment, connector elements may be spot welded (e.g., using laser welding) in one or more locations (e.g., a plurality of locations along the length of the connector elements). In at least one embodiment, the channels 23, 25 (e.g., coupling regions) may be "C"-shaped or "U"-shaped" and the channels 23, 25, may be crimped such that the "C"-shape or "U"-shape is deflected inwardly compressing the connector element located within the "C"-shaped or "U"-shaped channel. In at least one embodiment, an adhesive or flowable/moldable material (e.g., conductive polymer) may be used at one or more locations (e.g., a single location, a plurality of locations, etc.) to couple the connector elements 42, 44 in the connector element channel 23, 25.

Additional elements of the electrode assembly 16 depicted in FIG. 1 include an insulator 70 and a battery top cover 72. The insulator 70 may insulate the electrodes 30, 32 and the positive and negative mandrel portions 22, 24 from the battery top cover 72. Further, connector elements 42, 44 may extend through the insulator 70 and the battery top cover 72 and can be used as battery terminals 80, 82. The electrode assembly 16 may further include ferrules 84 attached (e.g., adhered, welded, etc.) to the battery top cover 72 to stabilize the terminals and isolate them from the battery top cover 72. A glass seal or sleeve (not shown) may be placed over each connector element 42, 44 prior to the placement of ferrules 84 to provide a seal between the connector elements and the battery top cover 72 and further insulate the ferrules 84 from the connector elements 42, 44.

The ferrules 84 may include (e.g., be formed of, etc.) titanium, titanium alloys, stainless steel, etc., and/or combinations or alloys thereof. The insulator 70 may include (e.g., be formed of, etc.) any insulating material such as, e.g., polyethylene, polypropylene, polyethylene terephthalate, polyimide, ethylene/tetrafluoroethylene copolymer (ETFE), etc., and/or combinations thereof. In at least one embodiment, the insulator may be a non-conductive film such as, e.g., DUPONT KAPTON polyimide film.

Although the electrode assembly 16 depicted in FIGS. 1-5 utilizes a positive and negative terminal without utilizing the case (e.g., the case is neutral), in other embodiments, a connection element (e.g., stud pin) can be coupled (e.g., welded) to the battery cover and may be configured for electrical coupling with one of the connector elements 42, 44 such that the case may be electrically coupled to one of the connector elements 42, 44 to provide the case as either a negative potential terminal/connection point or a positive potential terminal/connection point.

An end view an exemplary coiled electrode assembly 16 is shown in FIG. 4. As shown, the electrodes 30, 32 have been located (e.g., wound, wrapped, etc.) around or about the mandrel 20 (e.g., around axis 8) to create the coiled electrode assembly 16. As described herein, the mandrel 20 may include channels 23, 25 for the connector elements 42, 44 defined on the same side (or face) of the mandrel 20. Further, the electrodes 30, 32 may be electrically coupled to their respective mandrel portions 22, 24 on opposite sides of the mandrel 20. For example, uncoated portions (e.g., proximal end 34) of the electrodes 30, 32 can be connected to the positive and negative mandrel portions 22, 24 of the mandrel 20.

The separators, which are represented by white space between the electrodes 30, 32 in FIG. 4, can be attached so as to have opposing side adjacent to the positive electrode 30 and the negative electrode 32, respectively. When wound, the separators may isolate (e.g., electrically isolate or insulate, physically separate, etc.) the positive and negative electrodes 30, 32 from each other. The separators can be attached to the mandrel 20 using any one or more processes. For example, the separators can be connected using adhesive material etc. that is configured to couple, or adhere, the separators to the mandrel 20. Exemplary tape adhesive material may include polypropylene, polyethylene, polyester, nylon resin, etc. Exemplary adhesives may include, e.g., polyvinylidenefluoride (PVDF), co-polymers of polyhexafluoropropylene-polyvinylidenefluoride, poly(vinylacetate), polyvinylalcohol, polyethylene oxide, polyvinylpyrolidone, alkylated polyethylene oxide, polyvinyl ether, poly(methylmethacrylate), poly(ethylacrylate), polytetrafluoroethylene, polyvinylchloride, polyacrylonitrile, polyvinylpyridine, styrene-butadiene rubber, silicon, etc. and mixtures thereof.

Generally, to wind the electrodes 30, 32 around the mandrel 20, the mandrel 20 may be rotated using the removable portion 26 about axis 8. In other words, the removable portion 26 may be coupled to a rotation apparatus and the rotation apparatus may rotate the mandrel 20 such that the electrodes 30, 32 and one or more separators may be located (e.g., wrapped) around the mandrel 20. In at least one embodiment, the removable portion 26 may include a clamp portion. The clamp portion may be coupled to the rotation apparatus and may be configured to assist in the rotation of the mandrel 20 to wind the electrode 30, 32 thereabout. Further, the removable portion 26 may include any one or more features or portions that may further assist or aid in assembly (e.g., in coupling the mandrel to the rotation apparatus).

The rotation process may be performed manually or automatically. In at least one embodiment, the removable portion 26 of the mandrel 20 may be attached to a ligature or other holding mechanism (not shown) that can be turned by a motor. Once wound, any adhesive or attachment apparatus or material may be used to keep the electrodes in place (e.g., such that the electrodes 30, 32 do not unwind or unroll). For example, insulating tape can be used such as, e.g., Teflon, or polyimide tape such as, e.g., DUPONT KAPTON. In at least one embodiment, polymer material may be molded over one or both end regions or portions of the mandrel 20, e.g., to provide insulation between the electrodes 30, 32 and any other portion of the electrode assembly 16 or battery, to provide structure to the electrode assembly 16, to be used as the removable portion 26 of the mandrel 20, etc.

Figure 5B:
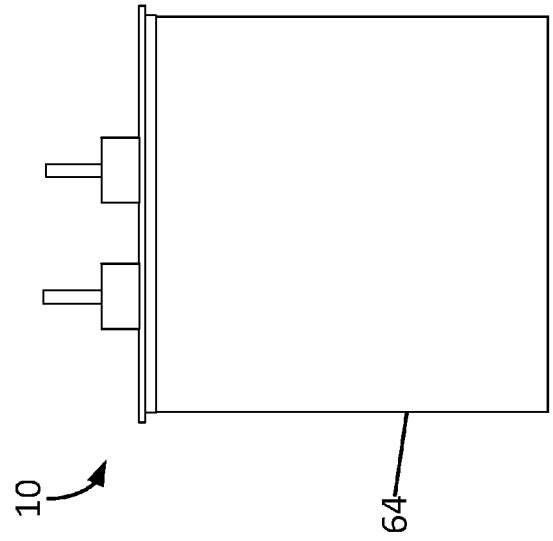
FIGS. 5A-5B are front views of exemplary battery assemblies using the coiled electrode assembly of FIG. 4.
Figure 5A:
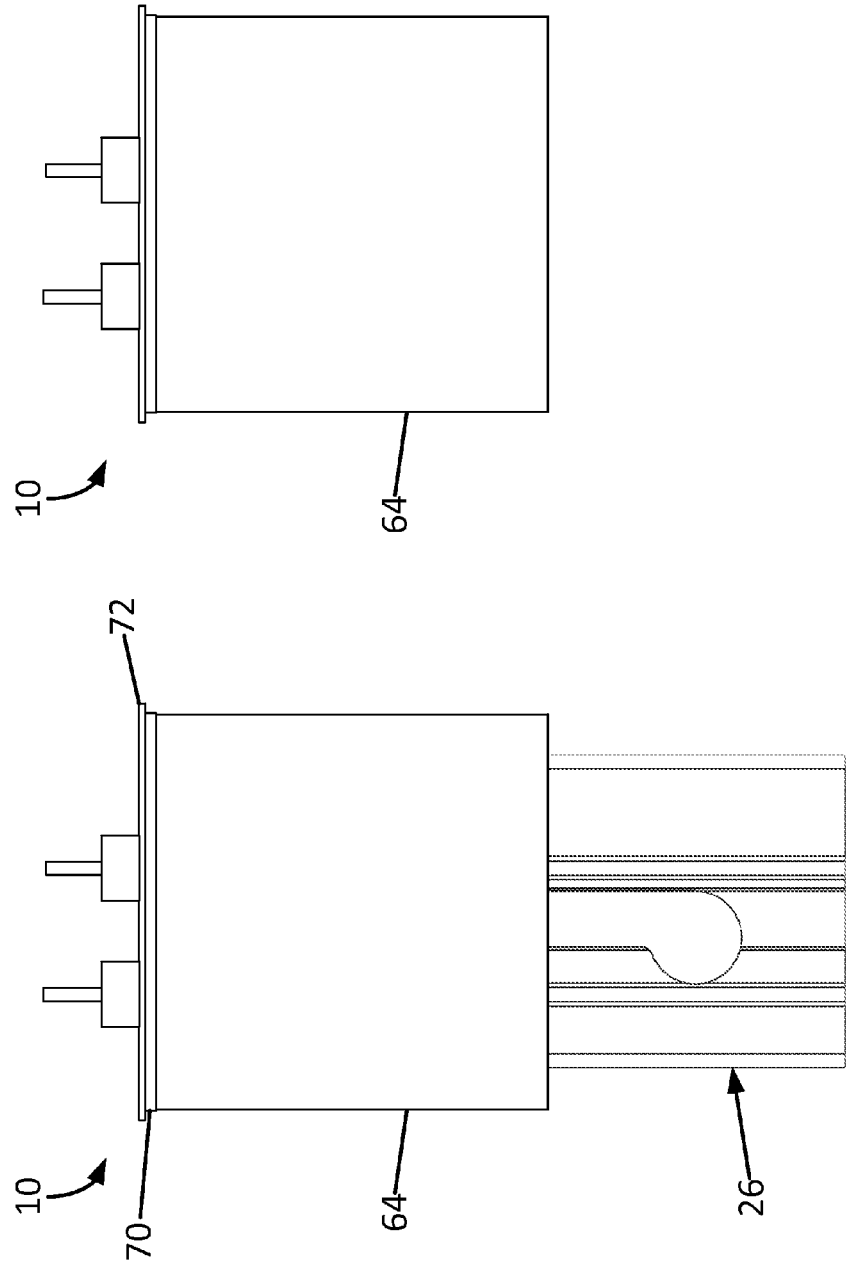

FIGS. 5A-5B show a battery assembly 10 including the coiled electrode assembly 16 made using a mandrel 20 described herein with reference to FIGS. 1-4. More specifically, the battery assembly 10 is depicted in FIG. 5A within an exemplary battery case 64 located over the positive and negative mandrel portions (not shown) and coiled electrodes (not shown) before the removable portion 26 is removed. Further, the battery assembly 10 is shown in FIG. 6B with the removable portion 26 removed. As illustrated, the battery case 64 is dimensioned so as to approximate the size of the mandrel without removable portion 26. Further, separation of the removable portion 26 may result in individual positive and negative mandrel portions 22, 24 of the mandrel 20 integrated into the coiled electrode assembly 16. In at least one embodiment, the coiled electrode assembly 16 can be wound or coiled to a tension desired to accommodate the battery rather than coiling the coiled electrode assembly to a tension that allows the mandrel 20 to be removed from the electrode coil.

Figure 6:
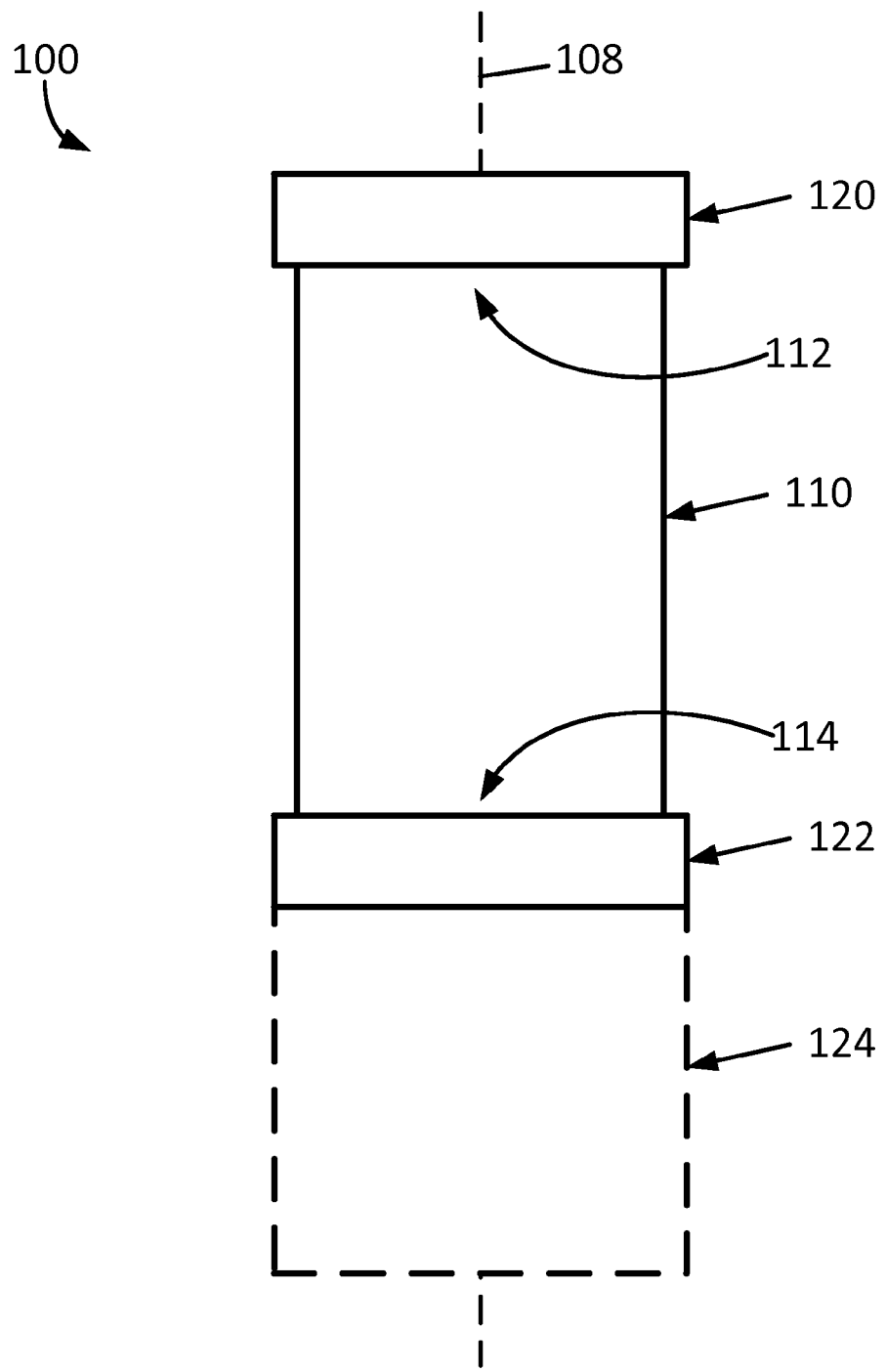
FIG. 6 is a diagrammatic view of an exemplary electrode assembly including a mandrel and one or more insulative portions.

One or more elements and/or features of the exemplary electrode assembly 16 and exemplary battery assembly 10 may be provided and/or coupled using one or more insulative portions. Such insulative portions may include a flowable material configured to be formed about and extending from one or more elements and/or features of the exemplary electrode assembly 16. A diagrammatic view of an exemplary electrode assembly including insulative portions is depicted in FIG. 6.

The exemplary mandrels and electrode assemblies may be used in batteries for medical devices (e.g., implantable medical devices) such as, e.g., defibrillators, pacemakers, neural stimulators, cardiac resynchronization therapy devices, drug pumps, insulin pumps, etc. and/or for any other device that may utilize electricity. In other words, exemplary medical devices (e.g., implantable medical devices) may include the mandrels and/or electrode assemblies described herein (e.g., in a battery) as well as any other components and/or features used to provide therapy by the medical devices. Such batteries may provide power (e.g., electricity) to the medical devices. For example, the batteries may be electrically coupled to components and/or features of the medical devices to provide power to such components and/or features.

Exemplary batteries and electrodes assemblies may include, or may utilize, one or more insulative portions to, e.g., provide additional structure, to insulate various portions, to assist in couple various portions together, etc. Exemplary electrode assemblies including insulative portions may be described herein with reference to FIGS. 6-12.

The exemplary electrode assembly 100 includes a mandrel 110 oriented along axis 108 and extending from a first end region 112 to a second end region 114. The mandrel 110 may be similar to the mandrel 20 described herein with reference to FIGS. 1-5. For example, the mandrel 110 may be configured such that one or more electrodes may be located (e.g., wrapped) about the mandrel 110 (e.g., about axis 108). The mandrel 110 may be formed of conductive or non-conductive material. In at least one embodiment, the mandrel 110 may be formed of conductive material and may be configured to be coupled (e.g., mechanically and electrically coupled) to one or more connector elements and/or electrodes.

A first insulative portion 120 may be formed about and may extend from the first end region 112 of the mandrel 110, and a second insulative portion 122 may be formed and may extend from the second end region 114 of the mandrel 110. The insulative portions 120, 122 may be formed using a flowable material configured to be molded about the mandrel 110. For example, the flowable material may include polypropylene, polyethylene, liquid crystal polymer (LCP), polyvinylidene fluoride (PVDF), styrene butadiene copolymer (SBR), polyether ether ketone (PEEK), ethylene tetrafluoroethylene (ETFE), fluorinated ethylene propylene (FEP), perfluoroalkoxy (PFA), nylon, PEBAX, an polyamide material, polybutylene teraphthalate, polyether ester, acrylonitrile butadiene styrene (ABS), polyoxy methylene or aceta (POM), polycarbonate, any ceramic, any glass or glass fiber, any foam (e.g., polymer foam, ceramic foam, etc.), etc.

The one or more insulative portions coupled to the mandrel 110 may be an injection-molded, non-conductive polymer. The injection-molded, non-conductive polymer may provide, or create, for example, a rigid structure for coiling an electrode about the mandrel 110, corrosion protection of dissimilar metal joints (e.g., joints or couplings between mandrel portions or other battery assembly elements), etc. In at least one embodiment, the one or more insulative portions may encapsulate, or partially encapsulate, one or more end regions of a mandrel 110.

Various elements and/or features may be incorporated into the insulative portions to replace one or more battery components such as the battery case liner, headspace insulator, removable mandrel portion, clamp portions, etc. Further, various features may be incorporated into the insulative portions such as connector elements (e.g., feedthrough pins, etc.), lead-ins (e.g., funnel-shaped apertures, etc.), battery coil case insertion lead-ins (similar funnel type shape), etc.

As described, each of the insulative portions 120, 122 may be formed about and extend from the first and second end regions 112, 114, respectively, of the mandrel 110. The end regions 112, 114 of the mandrel 110 may be defined as a portion of the mandrel 110 located near or proximate the ends of the mandrel 110. The insulative portions 120, 122 may be formed about such end regions 112, 114, respectively, and extend outwardly from the end regions 112, 114 in one or more directions (e.g., a single direction, two directions, a plurality of directions, all directions, etc.). For example, "extending from" may be defined as extending one or more, or two or more (e.g., a plurality), of directions from a fixed location or region, In at least one embodiment, the insulative portions 120, 122 are molded about the end regions 112, 114, respectively, and the directions the insulative portions 120, 122 extend from the end regions 112, 114 may be dictated by the mold. For example, the mold may include space, or compartments, for the material forming the insulative portions 120, 122 to flow into, which may be in one or more directions from the end regions 112, 114. Further, the directions that the insulative portions 120, 122 may extend from end regions 112, 114 may be defined with respect to the axis 108. For example, the insulative portions 120, 122 may extend in one or more directions parallel, perpendicular, or at any other angle from the axis 108.

As described herein, exemplary mandrels such as mandrel 110 may be configured to be coupled to various electrode assembly elements such as connector elements and electrodes. As such, the insulative portions 120, 122 may define features and/or include elements that may assist in the coupling of the electrode assembly elements to the mandrel. For example, the insulative portions 120, 122 may include connector element openings through which connector elements may be extended for coupling to the mandrel 110. In at least one embodiment, the connector element openings may be funnel-shaped to assist in the locating, or placing, the connector elements in the connector element openings.

The insulative portions 120, 122 may further form one or more features of the electrode assembly such as cover portions, insulators, ferrules, etc. For example, the insulative portions 120, 122 may form an insulator such as insulator 70, a battery top cover such as battery top cover 72, a battery case liner, a headspace liner, etc. When the insulative portions 120, 122 are configured to form insulators or top covers, such insulative portions may lie in planes generally perpendicular to the axis 108. Further, the insulative portion 120, 122 may be configured to insulate (e.g., electrically isolate) the mandrel 110 from other elements of the electrode assembly 100. For example, a conductive casing may cover the electrode assembly 100 after it has been assembled into a battery, and the insulative portions 120, 122 may insulate the mandrel 110 from the conductive casing.

Further, although not shown in FIG. 6, the mandrel 110 may include a positive mandrel portion and negative mandrel portion similar the positive and negative mandrel portions 22, 24 depicted in FIGS. 1-5. The insulative portions 120, 122 may be formed about and may extend from end regions of each of the mandrel portions and may be configured to insulate each of the positive and negative mandrel portions from each other. Further, as described, the positive and negative mandrel portions 22, 24 may be spaced apart from each other by passage "p." In at least one embodiment, the insulative portions 120, 122 may be located (e.g., fill in) the passage "p" (e.g., either partially or entirely) to insulate and space apart the mandrel portions 22, 24.

As shown in FIG. 6, the electrode assembly 100 may further include a removable portion 124 configured to be removable from the remainder of the assembly 100, e.g., after one or more electrodes have been located (e.g., wrapped) about the mandrel 110, prior to insertion of the assembly 100 into a battery casing, etc. The removable portion 124 may be coupled to the insulative portion 122, and may be removable from the insulative portion 122. The removable portion 124 may be similar in function and design as the removable portion 26 described herein with reference to FIGS. 1-5. In at least one embodiment, the removable portion 124 may include insulative material (e.g., the removable portion may be a removable insulative portion). In at least one embodiment, the removable portion 124 may include non-insulative material. Further, the removable portion 124 may include more than one material (e.g., a plurality of materials).

An exemplary electrode assembly 200 including a mandrel 210 and one or more insulative portions is depicted in FIGS. 7A-7D. The assembly 200 includes a mandrel 210 arranged, or oriented, along axis 208 and extending from a first end region 212 to a second end region 214. The mandrel 210 includes a positive mandrel portion 216 and a negative mandrel portion 218 separated by space 219. As shown, the positive mandrel portion 216 and the negative mandrel portion 218 may be similar, and as such, only the positive mandrel portion 216 will be further described in detail for simplicity. It is to be understood that the negative mandrel portion 218 may also include the same or similar elements and/or features as the positive mandrel portion 216 and may further be configured in the same or similar ways as the positive mandrel portion 216 (e.g., the insulative portions may be formed about and extend from the negative mandrel portion 218 in the same, or similar, way as the positive mandrel portion 216).

The positive mandrel portion 216 may be configured to be electrically and mechanically coupled to a positive electrode (which may be configured to be located (e.g., wrapped) around, or about, the mandrel 210). Further, the positive mandrel portion 216 may be configured to be electrically and mechanically coupled to a positive connector element configured to extend outside of battery casing in a battery assembly. To provide such coupling, the positive mandrel portion 216 may include a connector element coupling portion 230 and an electrode coupling portion 232 that are electrically and mechanically coupled to each other. For example, a portion of the connector element coupling portion 230 and a portion of the electrode coupling portion 232 may be positioned adjacent to each other to mechanically couple them to each other, or may be provide in any other manner. Various mandrels that may benefit from use of insulative portion described herein are further described in, e.g., U.S. patent application entitled "MANDREL FOR ELECTRODE ASSEMBLIES" (Medtronic C00001668USU1/MRG 134.0599 0101) and U.S. patent application entitled "MANDREL FOR ELECTRODE ASSEMBLIES" (Medtronic C00001682USU1/MRG 134.0601 0101), each filed on even date herewith and incorporated herein by reference in their entireties, as well as U.S. Patent Application Publication No. 2011/0250481 A1 entitled "COIL SEAL TO SECURE THE ELECTRODE WINDINGS OF AN ELECTROCHEMICAL CELL" filed on Mar. 9, 2011, U.S. patent application Ser. No. 13/332,686 entitled "THROUGH WELD INTERCONNECT JOINT" filed on Dec. 21, 2011, and U.S. Patent Application Publication No. 2012/0084979 A1 entitled "COILING DEVICE FOR MAKING AN ELECTRODE ASSEMBLY AND METHODS OF USE" filed on Sep. 12, 2011, each of which are also incorporated herein by reference in their entireties.

The connector element coupling portion 230 may define a connector element coupling region 270 configured for the coupling of a connector element to the connector element coupling portion 230, and therefore, to the positive mandrel portion 216. As shown, the connector element coupling region 270 may define a channel 271 extending parallel to the axis along the positive mandrel portion 216, within which and to which a connector element such as a feedthrough pin may be coupled.

The electrode coupling portion 232 may define an electrode coupling region 272 configured for the coupling of an electrode to the electrode coupling portion 232, and therefore, to the positive mandrel portion 216. As shown, the electrode coupling region 272 is defined by a flat, or planar, surface 273, to which an electrode (e.g., formed of foil) may be coupled thereto.

As described, the exemplary electrode assembly 200 includes one or more insulative portions. For example, the assembly 200 may include a first insulative portion 220 coupled to the first end region 212 of the mandrel 210 and a second insulative portion 222 coupled to the second end region 214 of the mandrel 210. More specifically, the first and second insulative portions 220, 222 may be formed about and extend from the first and second end regions 212, 214, respectively. For example, the insulative portions 220, 222 may extend in any direction from the end regions 212, 213 as depicted by the dotted-line arrows 250 about first insulative portion 220 depicted in FIG. 7A.

The insulative portions 220, 222 may further function to couple and space apart the positive mandrel portion 216 and the negative mandrel portion 218. For example, each of the positive mandrel portion 216 and the negative mandrel portion 218 may be coupled to each of the insulative portions 220, 222 thereby insulatively coupling the mandrel portions 216, 218. Spacing apart the positive mandrel portion 216 and the negative mandrel portion 218 by space 219 may electrically isolate the positive mandrel portion 216 from the negative mandrel portion 218. Further, since the insulative portions 220, 222 are not electrically conductive, the positive mandrel portion 216 and the negative mandrel portion 218 are electrically insulated, or isolated, by the insulative portions 220, 222.

Figure 7B:
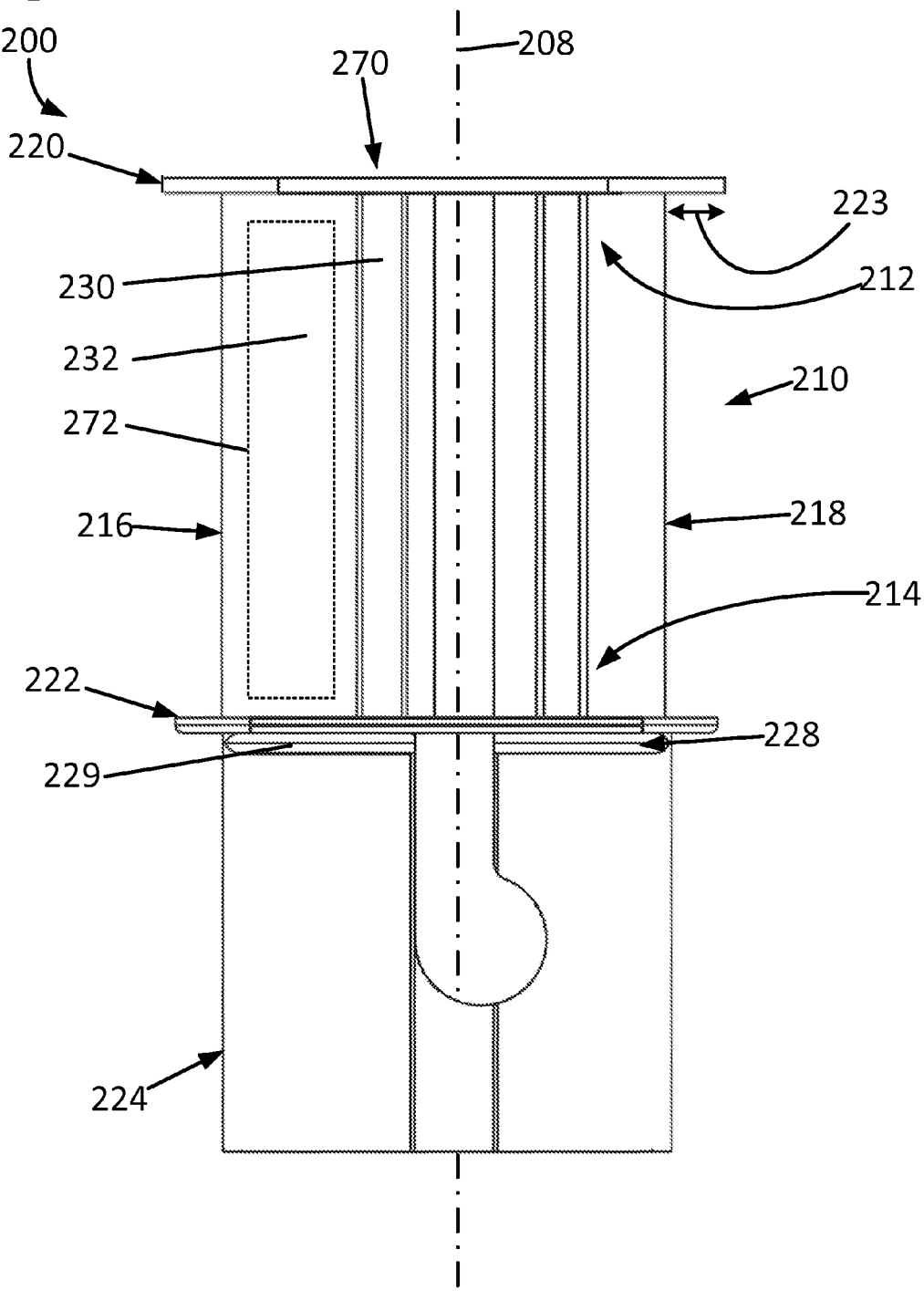
FIG. 7B is a front view of the electrode assembly of FIG. 7A.

As shown in FIG. 7B, each of the first insulative portion 220 and the second insulative portion 222 may include at least a portion that lies in a plane perpendicular to the axis 208 and extends a distance further than the mandrel 210 from axis 208 (e.g., has a larger cross section orthogonal to axis 208). For example, the first and second insulative portions 220, 222 may extend distance 223 (shown in FIG. 7B) from the negative mandrel portion 218. The distance 223 may provide space for electrodes (and separators) to be located (e.g., wrapped) about the mandrel 210. In other words, the distance 223 (e.g., produced by the size of the first and second insulative portions 220, 222) may be sized to fit, or accommodate, one or more electrodes, etc. in the space created such that a case may be located around the electrodes. Further, such planar portions of the first second insulative portions 220, 222 may form top and bottom cases or insulators for a battery. Further, such planar portions may guide an electrode when being coupled to and/or located about the mandrel 210 such that it remains centered on the mandrel 210.

Figure 7C:
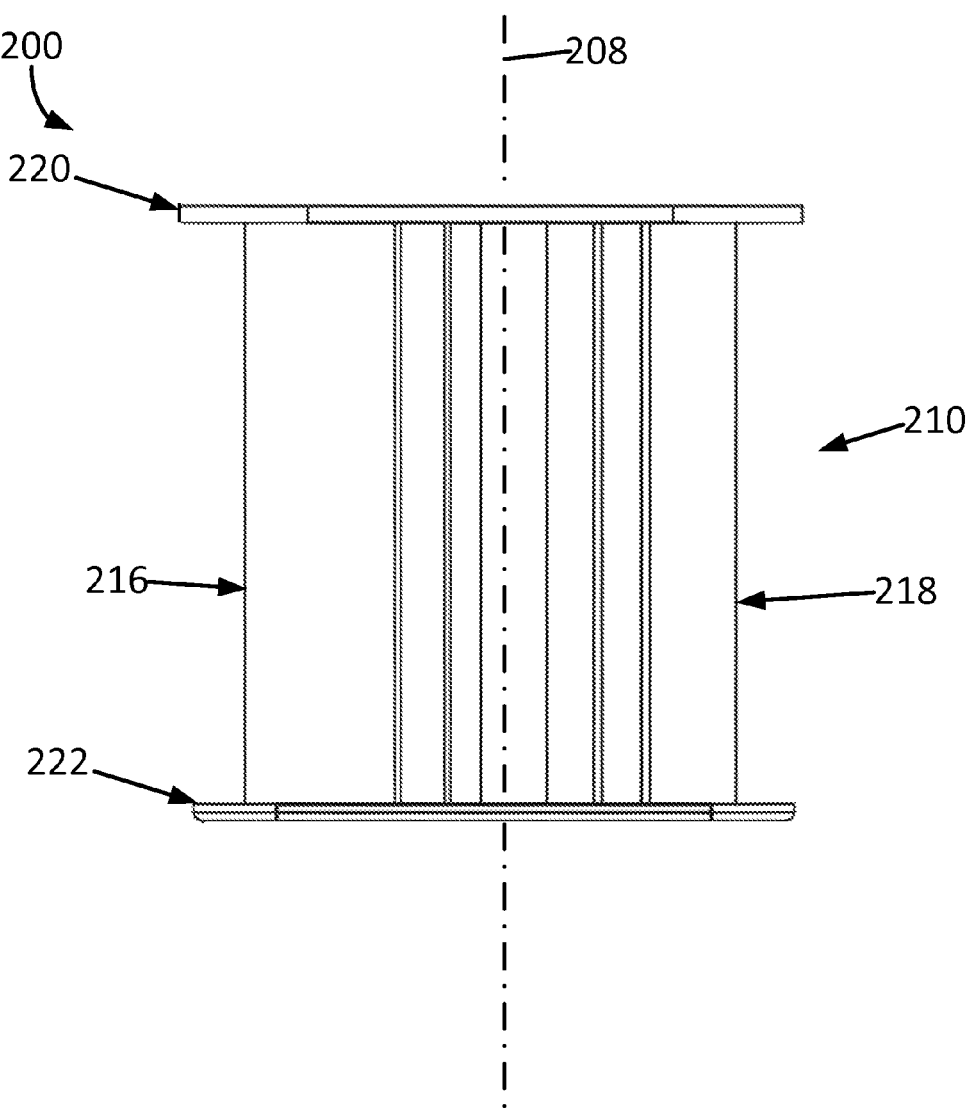
FIG. 7C is a front view of the electrode assembly of FIGS. 7A-7B without a removable portion.

The electrode assembly 200 may further include a removable portion 224 removably coupled to the second insulative portion 222. The removable portion 224 may be similar in function and design as the removable portion 26 described herein with reference to FIGS. 1-5. The removable portion 224 may further define a decoupling region 228 that may be similar to the decoupling region 28 described herein with reference to FIGS. 1-5. As shown, the decoupling region 228 is defined by a depression 229. The electrode assembly 200 with the removable portion 224 removed is depicted in FIG. 7C.

Figure 7D:
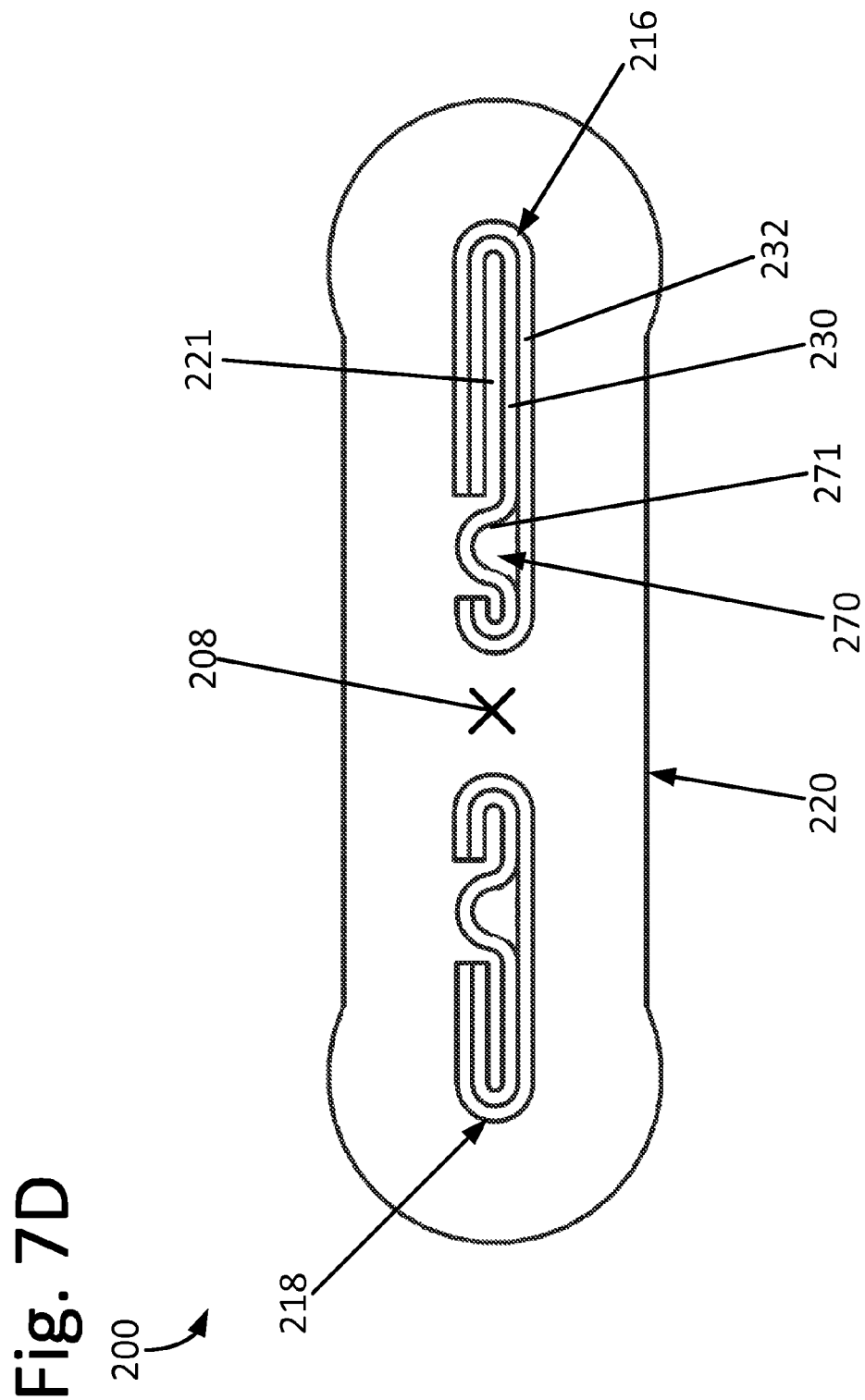
FIG. 7D is an end view of the electrode assembly of FIGS. 7A-7C.

As shown in the end view of FIG. 7D, one or more portions of the insulative portion 220 may also be located (e.g., formed) in an interior region 221 of the positive mandrel portion to, e.g., assist in the coupling of the insulative portion 220 to the positive mandrel portion 216, to provide structural support and rigidity to the positive mandrel portion 216, etc. Further, although not depicted in FIGS. 7A-7D, the mandrel 210 may further define fixation features configured to engage the insulative portions 220, 222, 224 to assist in the coupling of the insulative portions 220, 222, 224 to the mandrel 210. The fixation features may include bumps, apertures, ridges, rough surfaces, slots, etc. and may be further described herein in reference to other additional embodiments.

Figure 8:
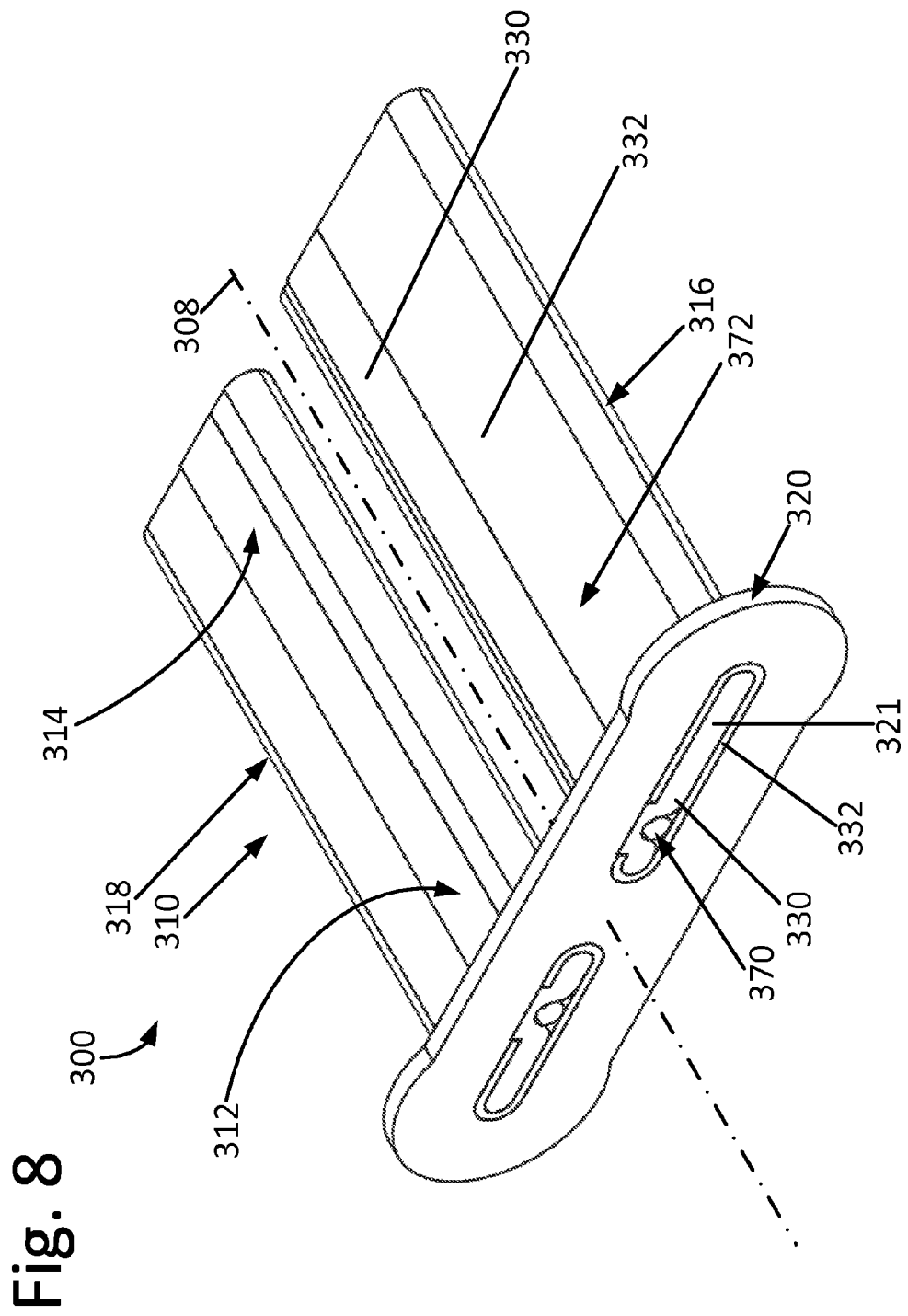
FIG. 8 is a perspective view of an exemplary electrode assembly including a mandrel and one or more insulative portions.

An exemplary electrode assembly 300 including a mandrel 310 and one or more insulative portions is depicted in FIG. 8. Similar to the mandrel 210 described herein with reference to FIGS. 7A-7D, the mandrel 310 may extend from a first end region 312 to a second end region 314 along an axis 308 and include a positive mandrel portion 316 and a negative mandrel portion 318. Each mandrel portion 316, 318 may include a connector element coupling portion defining a connector element coupling region and an electrode coupling portion defining an electrode coupling region although such portions and regions are only labeled on the positive mandrel portion 316. For example, the positive mandrel 316 may include a connector element coupling region 330 defining a connector element coupling region 370 and an electrode coupling portion 332 defining an electrode coupling region 372.

In the embodiment of FIG. 8, the connector element coupling portion 330 may fill (e.g., entirely or partially) an interior region 321 of the electrode coupling portion 332, e.g., to provide effective coupling between the connector element coupling portion 330 and the electrode coupling portion 332, to provide structural rigidity to the mandrel 110, etc. In at least one embodiment, the connector element coupling portion 330 may be coupled to the electrode coupling portion 332 by one or more methods, including welding (e.g., laser welding, resistance spot welding, ultrasonic welding, diffusion bonding, etc.), crimping, stamping, etc.

The insulative portion 320 may be formed about and may extend from the first end region 312 of the mandrel 310. As shown, the insulative portion 320 may electrically insulative, or isolate, and mechanically couple the positive and negative mandrel portions 316, 318 (e.g., the positive and negative mandrel portions 316, 318 may further be separated by spaced, or in a spaced relation).

Figure 9:
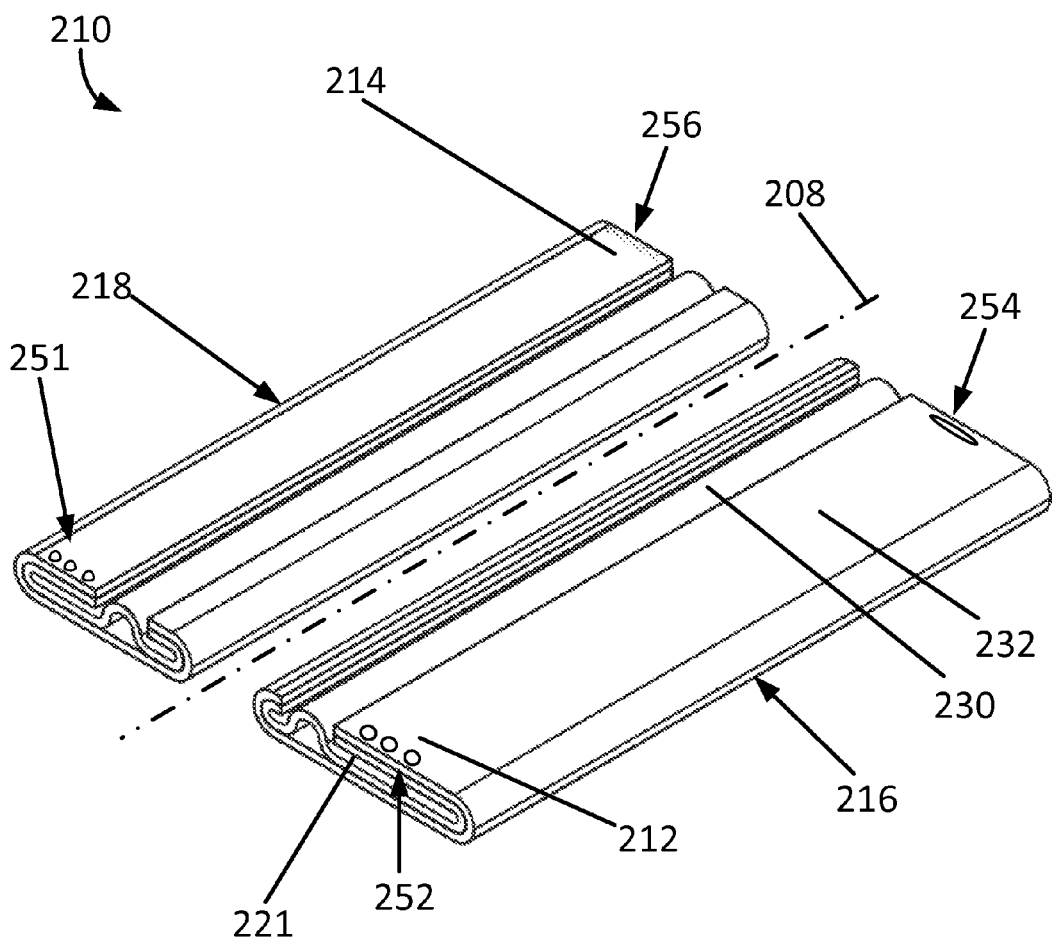
FIG. 9 is a perspective view of an exemplary mandrel for use in electrode assemblies including one or more insulative portions.

Exemplary mandrel 210 of FIGS. 7A-7D without one or more insulative portions is depicted in FIG. 9. The mandrel 210, as shown, may include one or more fixation features configured to engage one or more insulative portions to, e.g., assist in the coupling between the mandrel 210 and the one or more insulative portions. For example, the fixation features may be configured to provide additional surface area for the insulative portions to engage. Further, for example, the fixation features may be configured such that the insulative portions may extend through and/or around the features to provide coupling therebetween (e.g., the insulative portions may be overmolded over such features).

As shown, the first end region 212 of the negative mandrel portion 218 includes a plurality of hemispherical bumps 251 that may be configured to engage an insulative portion formed about the first end region 212 and extending therefrom. The hemispherical bumps 251 may provide additional surface area for the insulative portion to interact or engage (e.g., open overmolding this end region). Further, the first end region 212 of the positive mandrel portion 216 includes a plurality of apertures 252 extending through one or both of the electrode coupling portion 232 and the connector element coupling portion 230 that may be configured to engage an insulative portion formed about the first end region 212 and extending therefrom. The plurality of apertures 252 may allow an insulative portion to extend therethrough (e.g., such that the insulative portion encircles at least a portion of the positive mandrel portion 216, for example, upon overmolding this end region). For example, an insulative portion may extend into the interior region 221 of the positive mandrel portion 216 through the apertures 252 as shown in FIG. 7D.

The second end region 214 of the negative mandrel portion 218 includes a roughened surface 256 (as shown by the dotted region) that may be configured to engage an insulative portion formed about the second end region 212 and extending therefrom. The roughened surface 256 may provide additional surface area for the flowable material forming the insulative portion to interact or engage. The second end region 214 of the positive mandrel portion 216 includes a slot 254 extending through one or both of the electrode coupling portion 232 and the connector element coupling portion 230 that may be configured to engage an insulative portion formed about the first end region 212 and extending therefrom. The slot 254 may allow an insulative portion to extend therethrough such that the insulative portion encircles at least a portion of the positive mandrel portion 216. For example, an insulative portion may extend into the interior region 221 of the positive mandrel portion 216 through the slot 254 as shown in FIG. 7D.

An exemplary method 400 of providing an electrode assembly is depicted in the block diagram of FIG. 10. The method 400 may include providing a mandrel 402. The mandrel may be similar to any of the mandrels described herein as well as any other mandrels that may be used in a coiled electrode assembly.

Further, the method 400 may include providing a mold 404. The mold may be a one piece, or two or more piece, mold configured for molding a flowable material, such as, a polymer, ceramic, and/or any of the other materials described herein that may be included in exemplary insulative portions. The mandrel may be positioned within a cavity of the mold 406. The cavity may define a region or area for the mandrel such that the mandrel may not move once located, or provided, in the mold cavity. Further, if the mandrel includes more than one portion, the mold cavity may define an area for each of the one or more portions. For example, the mandrel may include a positive mandrel portion and a negative mandrel portion. The mold cavity may provide a region or area for each mandrel portion, and may also space the mandrel portions apart from one another (e.g., separated by space).

After the mandrel has been positioned inside the mold 406, flowable material may be provided inside of the mold cavity 408. In one or more embodiments, the flowable material may be solid and melted, or made flowing, e.g., by applying heat to the flowable material prior to providing it into the mold cavity. For example, the flowable material may be heated to at or above the melt temperature for the material being used (e.g., which varies for each different material). In at least one embodiment, the flowable material may be injected into the mold cavity through an opening in the mold. The flowable material may flow into open areas of the mold cavity that define locations about the mandrel where the insulative portions should be formed. For example, the mold cavity may define an open area proximate the first and second end regions of the mandrel such that insulative portions may be formed about the first and second end regions. Further, for example, the mold cavity may define an open area proximate an end region of the mandrel for forming a removable portion. Still further, for example, the mold cavity may define an open area between a pair of mandrel portions such as a positive mandrel portion and a negative mandrel portion such that the flowable material may form an insulative portion configured to space apart and insulate the pair of mandrel portions.

After the flowable material has cured or hardened (e.g., such that it is not flowable any longer), the mandrel and the newly formed insulative portion(s) may be removed from the mold 410. Although not depicted in FIG. 10, the exemplary method 400 may further include coupling an electrode to the mandrel as shown in FIG. 3 and locating, or placing, the electrode around the mandrel as shown in FIG. 4. In at least one embodiment, to locate (e.g., wrap) the electrode around the mandrel, the mandrel may be rotated about an axis while tension is applied to the electrode, e.g., to provide a tight coupling.

Another exemplary mandrel 510 for use in an exemplary electrode assembly including one or more insulative portions is depicted in FIG. 11A. Similar to the mandrel 210 described herein with reference to FIGS. 7A-7D, the mandrel 510 may extend from a first end region 512 to a second end region 514 and include a positive mandrel portion 516 and a negative mandrel portion 518. Each mandrel portion 516, 518 may include a connector element coupling portion defining a connector element coupling region and an electrode coupling portion defining a connector element coupling region although such portions are only labeled on the positive mandrel portion 516. For example, the positive mandrel 516 may include a connector element coupling portion 530 defining a connector element coupling region and an electrode coupling portion 532 defining an electrode coupling region.

The mandrel 510 further includes fixation features configured to engage with one or more insulative portions. More specifically, the first and second end regions 512, 514 of the mandrel 510 may define fixation apertures 540 and alignment apertures 541 extending through one or both of the electrode coupling and connector element coupling portions of the positive and negative mandrel portions 516, 518. The fixation apertures 540 may be configured to allow a flowable material to flow through and around the fixation apertures 540 such that when the flowable material hardens, the insulative portion formed by the flowable material may be effectively coupled to the mandrel 510. The alignment apertures 541 may be configured to allow apparatus to align the portions/elements of the mandrel 510, e.g., when placed in mold before introduction of the flowable material to form the insulative portions. For example, the alignment apertures 541 may allow pins, or the like, to enter the apertures 541 to hold the electrode coupling portions and the connector coupling portions of the positive and negative mandrel portions in place during, e.g., manufacturing, molding, etc. Further, in at least one embodiment, the alignment apertures 541 may also be configured to allow a flowable material to flow through and around the alignment apertures 541 similar to the fixation apertures 540.

Figure 11B:
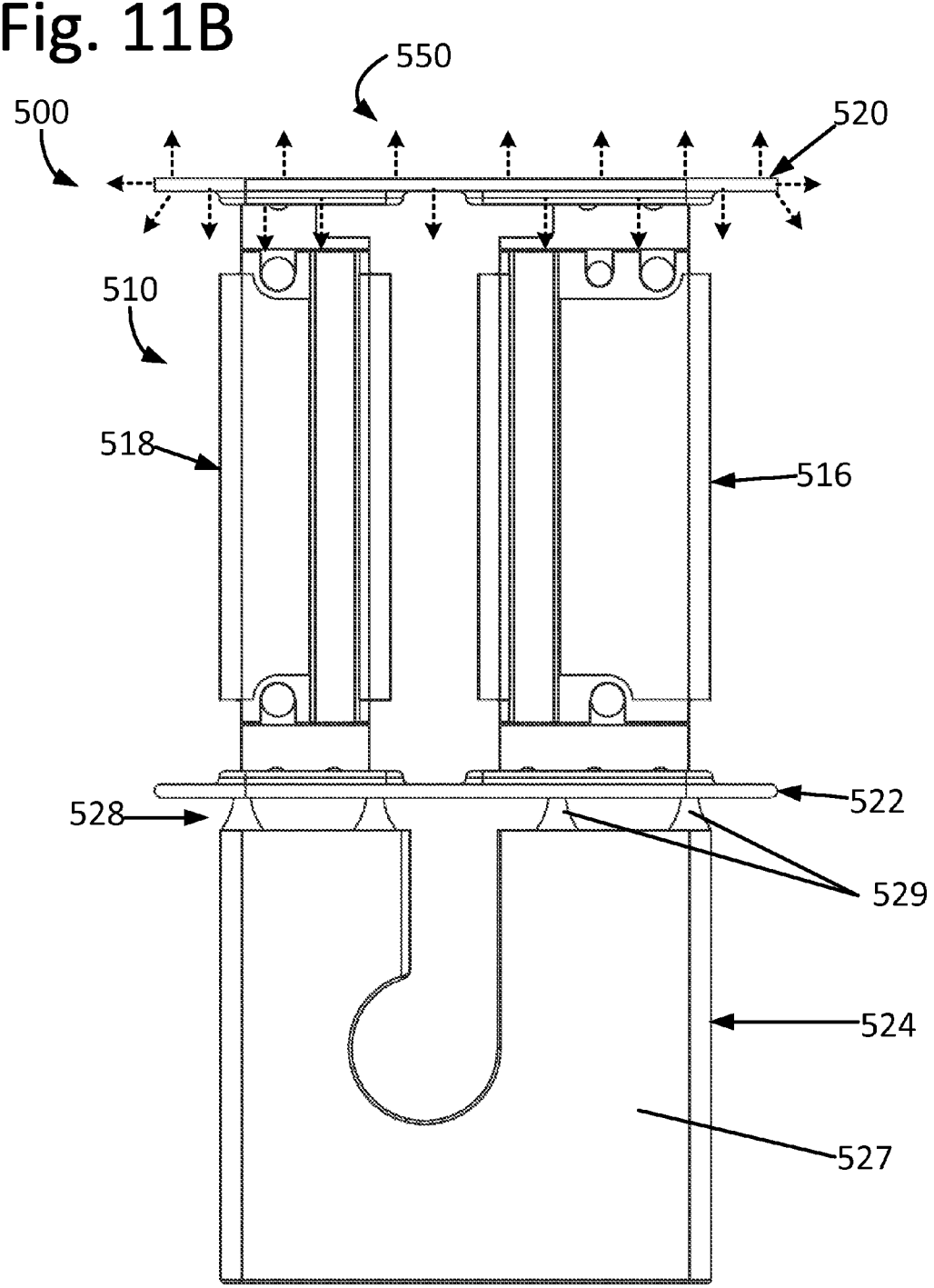
FIG. 11B is a front view of an exemplary electrode assembly including the mandrel of FIG. 11A and one or more insulative portions.

An exemplary electrode assembly 500 including the mandrel 510 of FIG. 11A and one or more insulative portions is depicted in FIG. 11B. As shown, the assembly 500 includes a first insulative portion 520 formed about and extending from the first end region 512 of the mandrel 510 and a second insulative portion 522 formed about and extending from the second end region 514 of the mandrel 510. For example, the insulative portions 520, 522 extend in any direction from the end regions 512, 514 as depicted by the dotted-line arrows 550 about the first insulative portion 520 depicted in FIG. 11B.

As shown, the positive mandrel portion 516 is wider than the negative mandrel portion 518, e.g., for manufacturability, to provide electrode coupling regions on opposite sides of the mandrel, etc. In other embodiments, the positive mandrel portion 516 may be substantially the same size as or smaller than the negative mandrel portion 518.

The assembly 500 further includes a removable portion 524 removably coupled to the second insulative portion about a decoupling region 528. The decoupling region 528 of the removable portion 524 may include elongate portions 529 extending from a body portion 527. The elongate portions 529 may extend between and coupled the body portion 527 and the second insulative portion 522. The decoupling region 528 may be configured to allow the removable portion 524 to be removed from the remainder of the assembly 500. In at least one embodiment, the removable portion 524 may be detached, or decoupled, by snapping, cutting, breaking, melting, tearing, and/or clipping the removable portion 524 from the second insulative portion 522 about or at the decoupling region 528. In at least one embodiment, the removable portion 524 and the second insulative portion 522 may be integrally molded, molded separately, of the same or different materials, etc. In at least one embodiment, the removable portion 524 may include insulative material (e.g., formed of insulative material, be insulative, etc.). In at least one embodiment, the removable portion 524 and the second insulative portion 522 may include (e.g., may be formed of) different materials than each other, each different material having different melting temperatures, such that, e.g., the removable portion 524 may be removed from the second insulative portion 522 by applying heat to the decoupling region 528 (e.g., thereby melting the connection or coupling between the removable portion 524 and the second insulative portion 522).

Figure 12A:
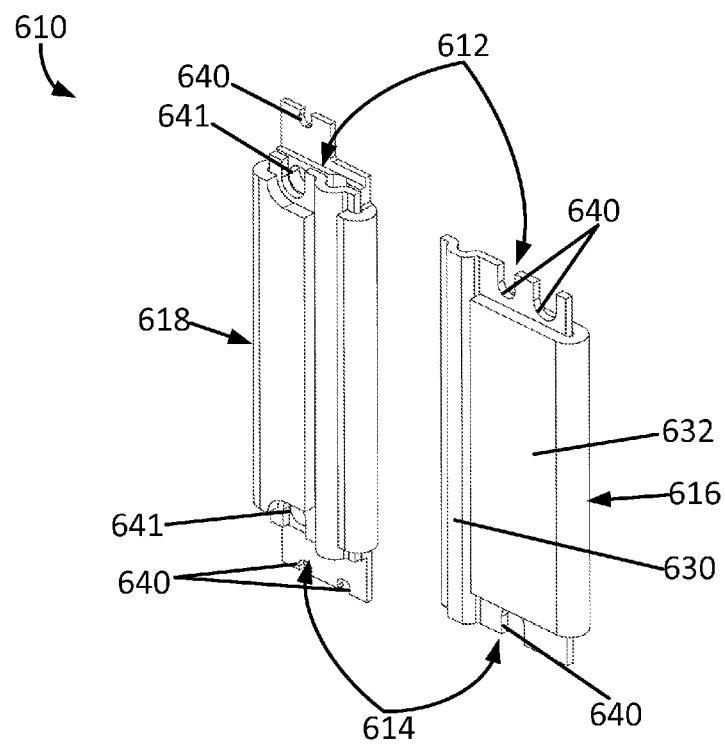
FIG. 12A is a perspective view of an exemplary mandrel for use in an electrode assembly including one or more insulative portions.

Further, another exemplary mandrel 610 for use in an exemplary electrode assembly including one or more insulative portions is depicted in FIG. 12A. Similar to the mandrel 210 described herein with reference to FIGS. 7A-7D, the mandrel 610 may extend from a first end region 612 to a second end region 614 and include a positive mandrel portion 616 and a negative mandrel portion 618. Each mandrel portion may include a connector element coupling portion defining a connector element coupling region and an electrode coupling portion defining a connector element coupling region although such portions are only labeled on the positive mandrel portion 616. For example, the positive mandrel 616 may include a connector element coupling portion 630 defining a connector element coupling region and an electrode coupling portion 632 defining an electrode coupling region.

Similar to the mandrel 510 described herein with reference to FIG. 11A, the mandrel 610 may include fixation features such as apertures 640 configured to engage with insulative portions. More specifically, the first and second end regions 612, 614 of the mandrel 610 may define fixation apertures 640 and alignment apertures 641 extending through one or both of the electrode coupling and connector element coupling portions of the positive and negative mandrel portions 616, 618. The fixation apertures 640 may be configured to allow a flowable material to flow through and around the fixation apertures 640 such that when the flowable material hardens, the insulative portion formed by the flowable material may be effectively coupled to the mandrel 610. Although the alignment apertures 641 may also allow flowable material to flow therethrough and thereabout like the fixation apertures 640, the alignment apertures 641 may be configured for use in, e.g., pinning alignment of the mandrel 610 during molding and/or other manufacturing processes.

Figure 12B:
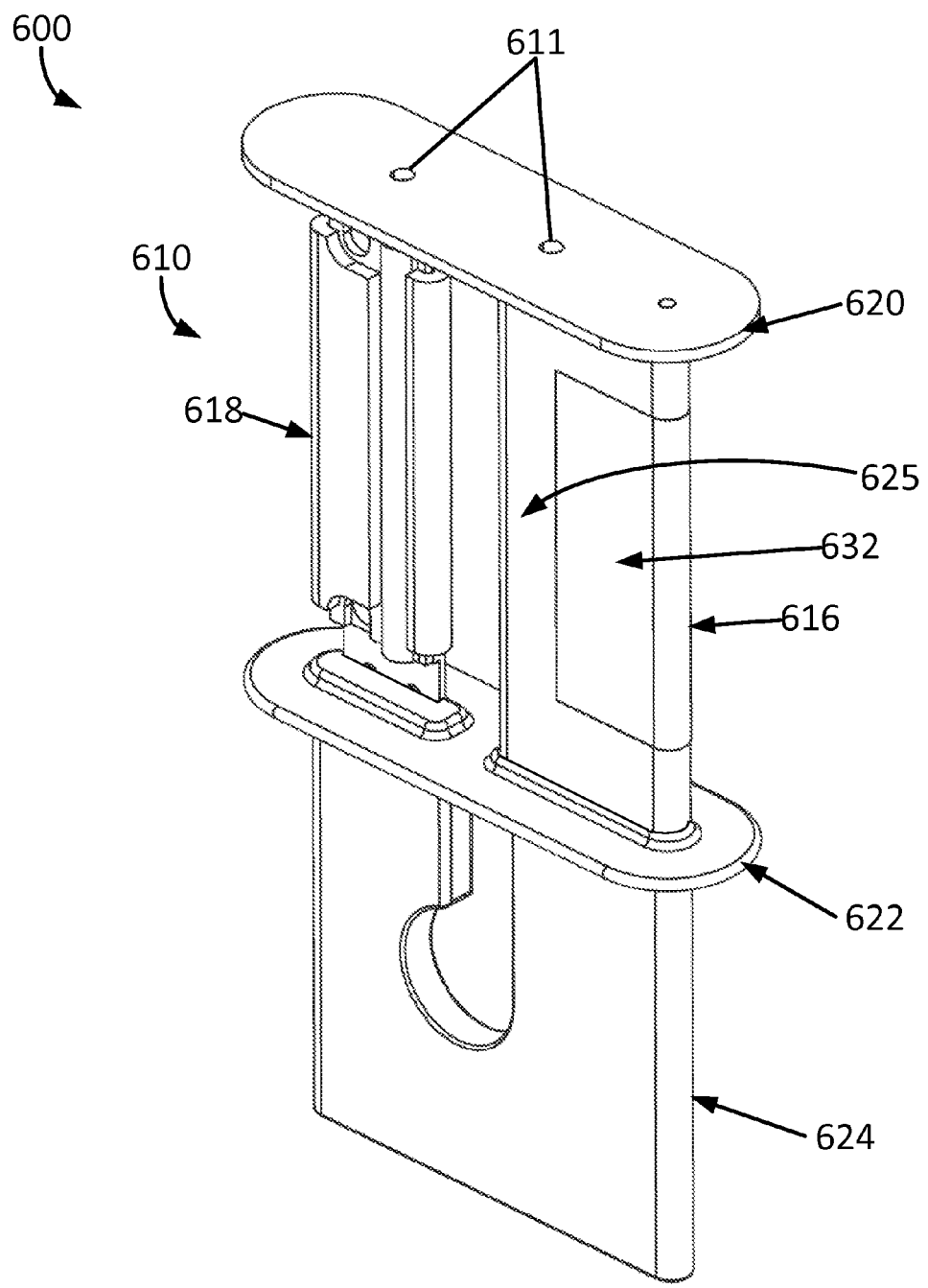
FIG. 12B is a perspective view of an exemplary electrode assembly including the mandrel of FIG. 12A and one or more insulative portions.
Figure 12C:
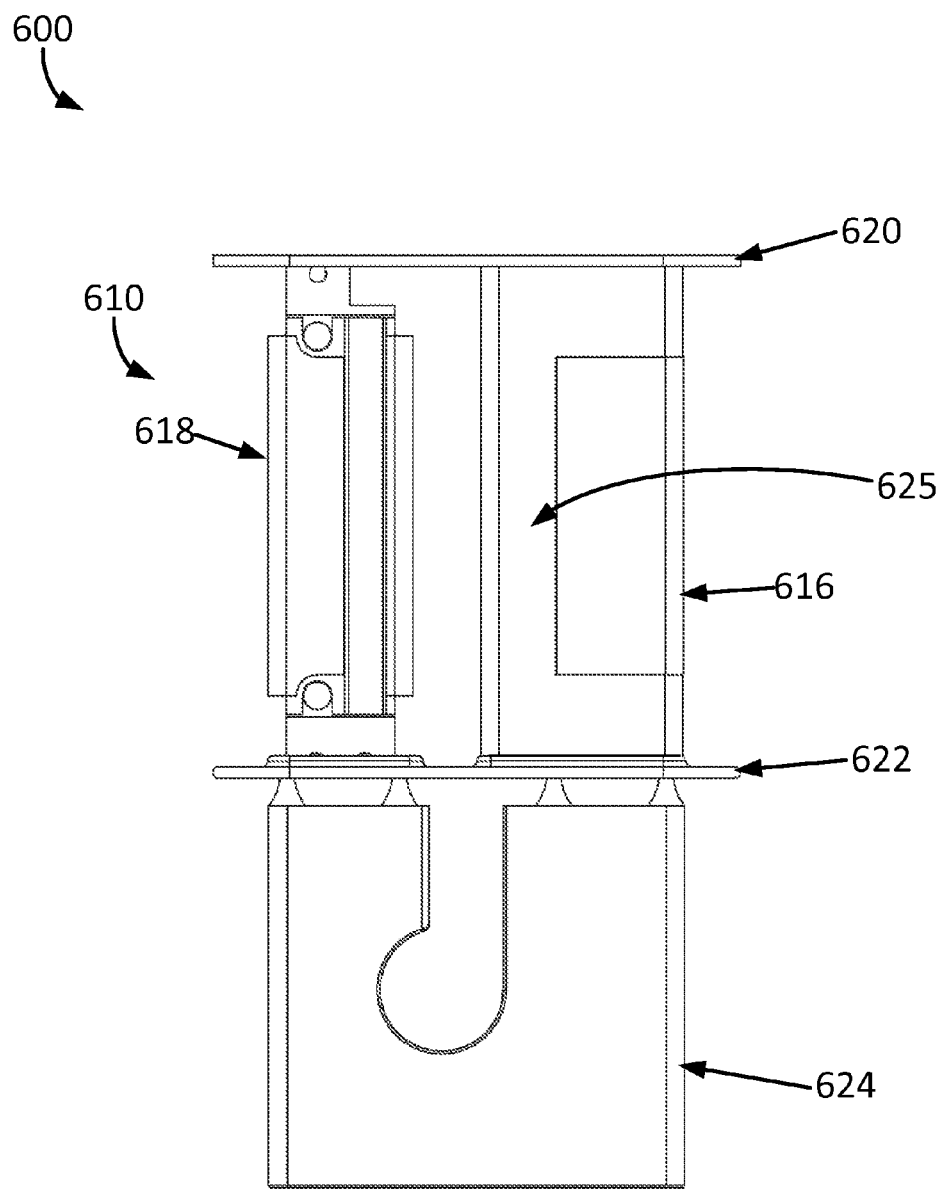
FIG. 12C is a front view of the exemplary electrode assembly of FIG. 12B.
Figure 12D:
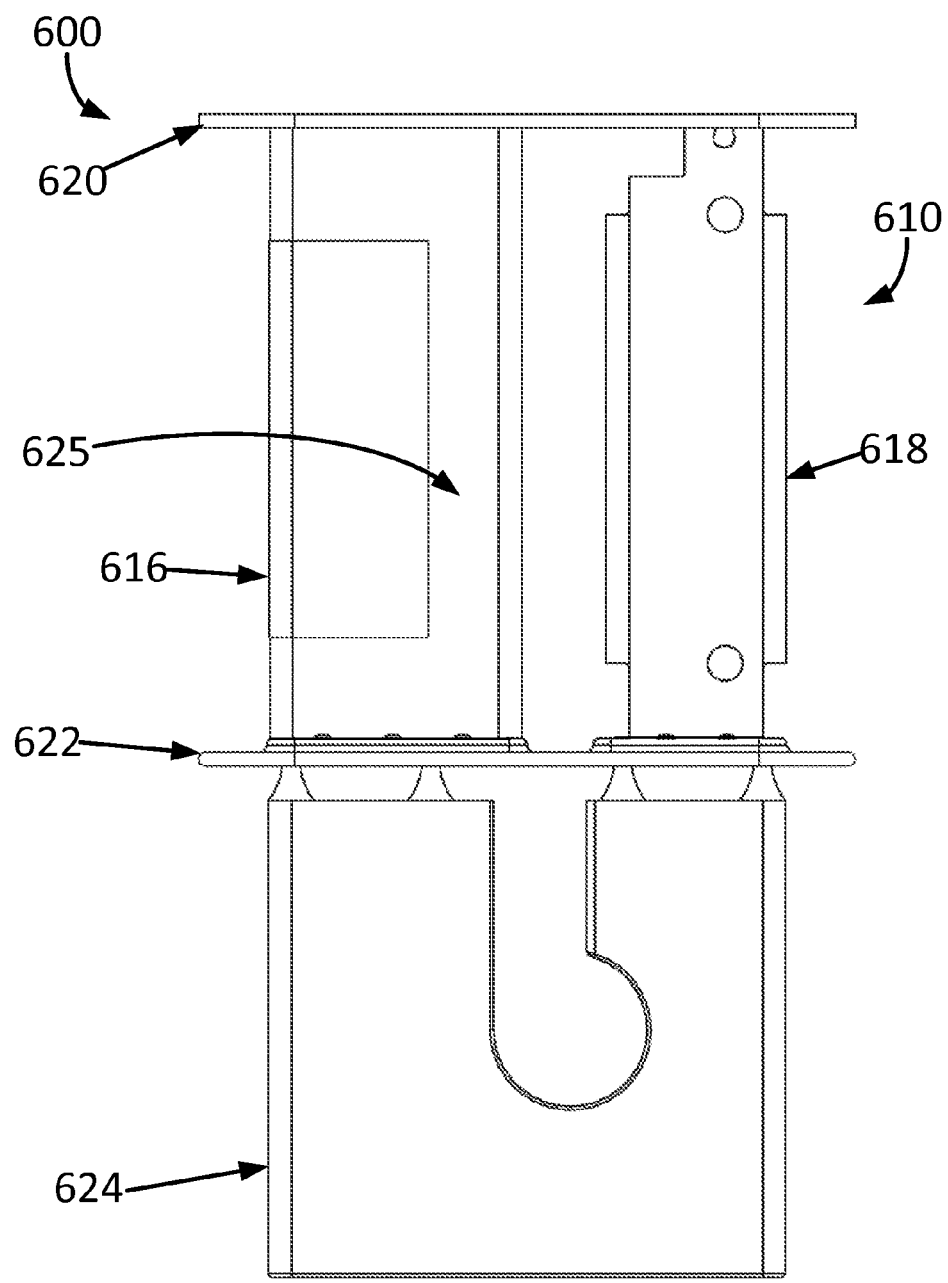
FIG. 12D is a rear view of the exemplary electrode assembly of FIGS. 12B-12C.

An exemplary electrode assembly 600 including the mandrel 610 of FIG. 12A and one or more insulative portions is depicted in FIGS. 12B-D. Similar to the assembly 500, the assembly 600 includes a first insulative portion 620 formed about and extending from the first end region 612 of the mandrel 610, and a second insulative portion 622 formed about and extending from the second end region 614 of the mandrel 610. Further, the assembly 600 includes a removable portion 624 coupled or connected to the second insulation portion 622. As shown in FIG. 12B, the first insulative portion 620 may define connector element openings 611 configured to allow connector elements to be positioned therein, extended therethrough, or otherwise coupled to the mandrel 610.

The first insulative portion 620 and the second insulative portion 622 further extend towards each other to at least partially encapsulate the positive mandrel portion 616. In other words, the first and second insulative portions 620, 622 may form an encapsulation region 625 that covers and extends from (e.g., wraps around) at least a portion of the positive mandrel portion 616. The encapsulation region 625, as shown, covers, or is provide, around the connector element coupling portion 630 while leaving the electrode coupling portion 632 exposed, e.g., for providing an electrode coupling region for coupling to an electrode. Although the encapsulation region 625 is only provided on the positive mandrel portion 616 in the embodiment depicted (e.g., for illustrative purposes), in other embodiments the negative mandrel portion 618 may be provided with an encapsulation region for the same reasons as the positive mandrel portion 616.

In one or more embodiments, at least part, or all, of the electrode coupling portions 632 may also be covered (e.g., encapsulated, wrapped, etc.) by the encapsulation region 625. In these embodiments, at least a portion of the encapsulation region 625 may be removed to access the electrode coupling portion 623 for the coupling of an electrode thereto. In other words, "windows" may be formed in the encapsulation region 625 to provide access therethrough.

Although the encapsulation region 625 is only shown with respect to the positive mandrel portion 616, the insulative portions 620, 622 may further provide an encapsulation region formed about the negative mandrel portion 518.

Figure 12E:
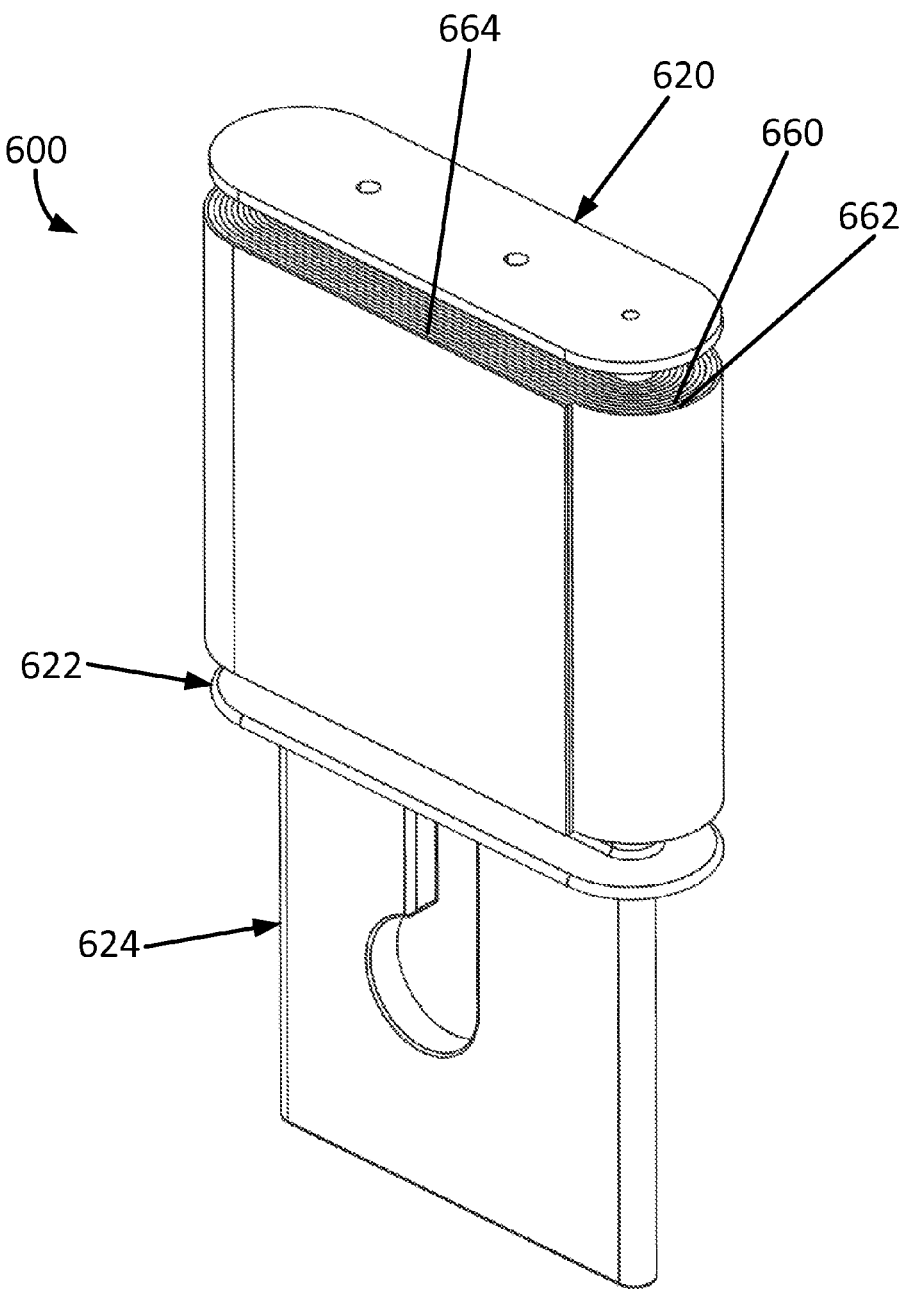
FIG. 12E is a perspective view of the exemplary electrode assembly of FIGS. 12B-12D including one or more electrodes coupled to the mandrel.

The exemplary electrode assembly 600 including one or more electrodes coupled to and located (e.g., wrapped) about the mandrel 610 (e.g., using the polymer removable portion 624 connected to manipulation apparatus) is depicted in FIG. 12E. For example, a positive electrode 660 coupled to the positive mandrel portion 616 and a negative electrode 662 coupled to the negative mandrel portion 618 are shown located (e.g., wrapped) around the mandrel 610. Further, a separator material 664 is located between each of the positive and negative mandrel portions 616, 618, which may be similar to the separator material described herein with reference to FIGS. 1-5.

This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the apparatus and methods described herein. Various modifications of the illustrative embodiments, as well as additional embodiments of the disclosure, will be apparent upon reference to this description.

What is claimed:

1. An electrode assembly comprising:
   a mandrel extending from a first end region to a second end region along an axis, wherein the mandrel is configured to be coupled to at least one electrode, the at least one electrode locatable at least partially about the mandrel, wherein the mandrel comprises a positive mandrel portion and a negative mandrel portion spaced apart from the positive mandrel portion; and
   at least one insulative portion formed about and extending from at least one of the first and the second end regions of the mandrel, wherein the at least one insulative portion is formed about the first and the second end regions of each of the positive and the negative mandrel portions.

2. The assembly of claim 1, wherein the at least one insulative portion further defines a connector element opening configured to allow a connector element to be extended therethrough for coupling to the mandrel.

3. The assembly of claim 1, wherein at least a portion of the at least one insulative portion lies in a plane perpendicular to the axis.

4. The assembly of claim 1, wherein the at least one insulative portion comprises:
   a first insulative portion formed about and extending from the first end region of the mandrel, and
   a second insulative portion formed about and extending from the second end region of the mandrel, each of the first and the second insulative portions configured to insulate the mandrel from a battery casing.

5. The assembly of claim 1, wherein the at least one insulative portion comprises a removable portion, wherein the removable portion is configured to be coupled to manipulation apparatus operable to rotate the mandrel to locate at least one electrode around the mandrel.

6. The assembly of claim 1, wherein the at least one insulative portion comprises at least ethylene tetrafluoroethylene.

7. The assembly of claim 1, wherein the at least one insulative portion is configured to electrically insulate and space apart the negative mandrel portion from the positive mandrel portion.

8. The assembly of claim 1, wherein at least one of the first and the second end regions of the mandrel defines one or more fixation features configured to engage the at least one insulative portion.

9. The assembly of claim 8, wherein each of the positive and the negative mandrel portions comprises a connector element coupling portion and an electrode coupling portion, and wherein at least part of the at least one insulative portion is formed about each of the connector element coupling and the electrode coupling portions to couple the connector element coupling portions and the electrode coupling portions of each of the positive and the negative mandrel portions.

10. The assembly of claim 1, wherein each of the positive and the negative mandrel portions defines:
    a connector element coupling region configured for coupling to a connector element; and
    an electrode coupling region configured for coupling to an electrode.

11. An electrode assembly comprising:
    a mandrel extending from a first end region to a second end region along an axis, wherein the mandrel is configured to be coupled to at least one electrode, the at least one electrode locatable at least partially about the mandrel; and
    at least one insulative portion coupled to at least one of the first and the second end regions of the mandrel, wherein the at least one insulative portion comprises an insulative portion configured to insulate the mandrel from a battery casing and a removable portion removably coupled to the insulative portion.

12. The assembly of claim 11, wherein the at least one insulative portion is formed about and extending from the at least one of the first and the second end regions of the mandrel.

* * * * *